United States Patent
Jabara et al.

(10) Patent No.: US 9,179,296 B2
(45) Date of Patent: Nov. 3, 2015

(54) SYSTEM AND METHOD FOR DEVICE AUTHENTICATION IN A DYNAMIC NETWORK USING WIRELESS COMMUNICATION DEVICES

(75) Inventors: Gary B. Jabara, Irvine, CA (US); Christos Karmis, Irvine, CA (US); David Brett Simon, Agoura Hills, CA (US); Lloyd Frederick Linder, Agoura Hills, CA (US)

(73) Assignee: Mobilitie, LLC, Newport Beach, CA (US)

( * ) Notice: Subject to any disclaimer, the term of this patent is extended or adjusted under 35 U.S.C. 154(b) by 683 days.

(21) Appl. No.: 13/363,943

(22) Filed: Feb. 1, 2012

(65) Prior Publication Data

US 2012/0135711 A1 May 31, 2012

Related U.S. Application Data

(63) Continuation-in-part of application No. 13/093,998, filed on Apr. 26, 2011, now Pat. No. 8,995,923, which is a continuation-in-part of application No. 12/958,296, filed on Dec. 1, 2010, now Pat. No. 9,077,564, which is a continuation-in-part of application No. 12/616,958, filed on Nov. 12, 2009, now Pat. No. 8,190,119, which is a continuation-in-part of application No. 12/397,225, filed on Mar. 3, 2009, now Pat. No. 7,970,351.

(51) Int. Cl.
*H04W 8/18* (2009.01)
*H04L 29/06* (2006.01)
(Continued)

(52) U.S. Cl.
CPC ............ *H04W 8/186* (2013.01); *H04L 63/0876* (2013.01); *H04W 12/06* (2013.01);
(Continued)

(58) Field of Classification Search
CPC ... H04W 76/022; H04W 40/00; H04W 40/02; H04W 4/16; H04W 4/20; H04W 76/02; H04W 76/028; H04W 76/041; H04W 76/06; H04W 80/00; H04W 84/16; H04W 88/16; H04W 8/12

USPC .......... 455/435.2, 428, 525, 3.04, 464, 151.1, 455/41.2; 370/327, 355, 356
See application file for complete search history.

(56) References Cited

U.S. PATENT DOCUMENTS 7,328,191 B2 * 2/2008 McGee et al. .................. 705/67
7,512,567 B2 * 3/2009 Bemmel et al. ................ 705/67
(Continued)

FOREIGN PATENT DOCUMENTS

KR 1020100038089 A 12/2010

OTHER PUBLICATIONS

Korean Intellectual Property Office; International Search Report; Jul. 18, 2012; ISA/KR, 189 Cheongsa-ro, Seo-gu, Daejeon Metropolitan City, 302-701, Republic of Korea.

*Primary Examiner* — Minh D Dao
(74) *Attorney, Agent, or Firm* — Michael J. Donohue; Davis Wright Tremaine LLP

(57) ABSTRACT

A short-range wireless network is established by direct communication between wireless devices and wireless access points. A wireless communication device provides initial registration information to a network and becomes a registered device. An API is downloaded to the wireless device to permit automatic authentication of the device for future communications. When a registered device enters a venue, at least one access point will automatically detect the wireless device and extract the necessary identification data to permit authentication of the device. Customized messages may be provided to the wireless device. If the wireless device enters a different venue, even in another city or state, the registration data may be automatically extracted by an AP and provided to a cloud network for authentication. Authenticated devices receive a list of authenticated vendors and unauthenticated vendors near the present location of the authenticated device.

22 Claims, 12 Drawing Sheets

(51) Int. Cl.
  *H04W 12/06* (2009.01)
  *H04W 4/02* (2009.01)
  *H04W 8/20* (2009.01)
  *H04W 76/00* (2009.01)
  *H04W 84/18* (2009.01)
  *H04W 88/04* (2009.01)

(52) U.S. Cl.
  CPC .............. *H04W 4/021* (2013.01); *H04W 8/205* (2013.01); *H04W 76/005* (2013.01); *H04W 84/18* (2013.01); *H04W 88/04* (2013.01)

(56) References Cited

U.S. PATENT DOCUMENTS

| | | | | |
|---|---|---|---|---|
| 8,086,245 | B2 * | 12/2011 | Karaoguz et al. | 455/456.1 |
| 8,132,233 | B2 * | 3/2012 | Gronholm et al. | 726/3 |
| 8,177,135 | B2 * | 5/2012 | Faith et al. | 235/472.01 |
| 8,534,550 | B2 * | 9/2013 | Faith et al. | 235/382 |
| 8,646,060 | B1 * | 2/2014 | Ben Ayed | 726/9 |
| 8,787,380 | B2 * | 7/2014 | Taleb et al. | 370/392 |
| 2005/0222963 | A1 * | 10/2005 | Johnson | 705/67 |
| 2006/0186197 | A1 * | 8/2006 | Rosenberg | 235/380 |
| 2007/0208497 | A1 * | 9/2007 | Downs et al. | 701/117 |
| 2008/0056215 | A1 | 3/2008 | Kopikare | |
| 2009/0016248 | A1 | 1/2009 | Li et al. | |
| 2009/0213819 | A1 | 8/2009 | Kalhan | |
| 2009/0318124 | A1 * | 12/2009 | Haughn | 455/418 |
| 2011/0302012 | A1 * | 12/2011 | Duroux et al. | 705/14.17 |
| 2012/0082090 | A1 * | 4/2012 | Horn et al. | 370/328 |
| 2012/0316963 | A1 * | 12/2012 | Moshfeghi | 705/14.58 |
| 2012/0317224 | A1 * | 12/2012 | Caldwell et al. | 709/217 |
| 2013/0006784 | A1 * | 1/2013 | Krauss et al. | 705/18 |
| 2013/0095789 | A1 * | 4/2013 | Keevill et al. | 455/411 |
| 2013/0185552 | A1 * | 7/2013 | Steer | 713/156 |
| 2013/0226803 | A1 * | 8/2013 | Hsu et al. | 705/44 |
| 2014/0108149 | A1 * | 4/2014 | Jabara et al. | 705/14.64 |
| 2014/0108174 | A1 * | 4/2014 | Bernheim | 705/21 |
| 2015/0043429 | A1 * | 2/2015 | Kim et al. | 370/328 |

* cited by examiner

SYSTEM AND METHOD FOR DEVICE AUTHENTICATION IN A DYNAMIC NETWORK USING WIRELESS COMMUNICATION DEVICES

RELATED APPLICATIONS

This application is a continuation-in-part of U.S. application Ser. No. 13/093,998 filed on Apr. 26, 2011, which is a continuation-in-part of U.S. application Ser. No. 12/958,296 filed on Dec. 1, 2010, which is a continuation-in-part of U.S. application Ser. No. 12/616,958 filed on Nov. 12, 2009 now U.S. Pat. No. 8,190,119, which is a continuation-in-part of U.S. application Ser. No. 12/397,225 filed on Mar. 3, 2009, now U.S. Pat. No. 7,970,351, the entire disclosures and content of which are hereby incorporated by reference in their entirety.

BACKGROUND OF THE INVENTION

1. Field of the Invention

The present invention is directed generally to wireless communication devices and, more particularly, to a system and method of network management to permit the dynamic formation of short-range communication networks using direct communication between wireless communication devices.

2. Description of the Related Art

Wireless communication networks have become commonplace. A vast array of base stations is provided by a number of different wireless service providers. Wireless communication devices, such as cell phones, personal communication system (PCS) devices, personal digital assistant (PDA) devices, and web-enabled wireless devices communicate with the various base stations using one or more known communication protocols. While early cell phone devices were limited to analog operation and voice-only communication, modern wireless devices use digital signal protocols and have sufficient bandwidth to enable the transfer of voice signals, image data, and even video streaming. In addition, web-enabled devices provide network access, such as Internet access.

In all cases, the individual wireless communication devices communicate with one or more base stations. Even when two wireless communication devices are located a few feet from each other, there is no direct communication between the wireless devices. That is, the wireless devices communicate with each other via one or more base stations and other elements of the wireless communication network.

Some wireless service providers have included push-to-talk (PTT) technology that allows group members to communicate with each other using PTT technology. Thus, when one group member presses the PTT button, the communication from that individual is automatically transmitted to the communication devices of other group members. While this gives the appearance of direct communication between the wireless devices, the communications between group members are also relayed via one or more base stations as part of the wireless network.

Therefore, it can be appreciated that there is a need for wireless communication devices that can communicate directly with nearby wireless devices. The present invention provides this, and other advantages, as will be apparent from the following detailed description and accompanying figures.

BRIEF DESCRIPTION OF THE SEVERAL VIEWS OF THE DRAWING(S)

DETAILED DESCRIPTION OF THE INVENTION

The system described herein extends the normal operational features of conventional wireless communication devices. As described above, the conventional wireless communication device communicates with a wireless communication network base station using a first transceiver (i.e., a network transceiver). The extended capabilities described herein provide a second transceiver device that allows wireless communication devices to communicate directly with each other over a short distance and further describes network management techniques capable of managing a dynamic network that may change quickly.

Figure 1:
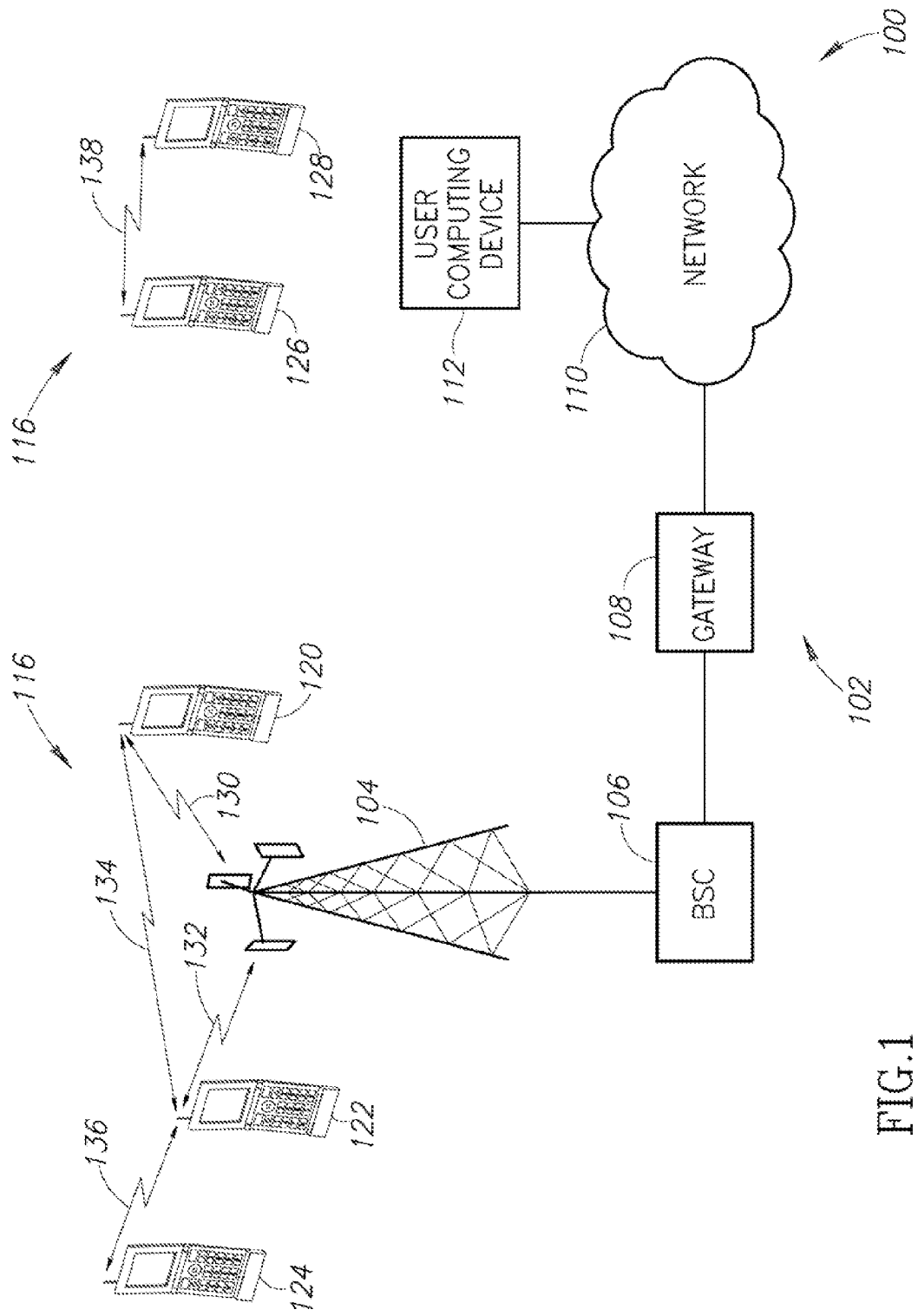
FIG. 1 is a diagram illustrating a system architecture configured to implement a communication system in accordance with the present teachings.

The wireless communication devices are illustrated as part of a system 100 illustrated in the system architecture in FIG. 1. Portions of the system 100 are conventional wireless network components that will be described briefly herein. The non-network communication capability, which may be referred to herein as a "jump-enabled" device or a "jump" device, will be described in greater detail below. The term "jump" refers to the ability of a wireless device designed and operated in accordance with the present teachings to jump from one short-range wireless network to another.

A conventional wireless communication network 102 includes a base station 104. Those skilled in the art will appreciate that the typical wireless communication network 102 will include a large number of base stations 104. However, for the sake of brevity and clarity in understanding the present invention, FIG. 1 illustrates only a single base station 104.

The base station 104 is coupled to a base station controller (BSC) 106. In turn, the BSC 106 is coupled to a gateway 108. The BSC 106 may also be coupled to a mobile switching center (not shown) or other conventional wireless communication network element. The gateway 108 provides access to a network 110. The network 110 may be a private core network of the wireless communication network 102 or may be a wide area public network, such as the Internet. In FIG. 1, a user computing device 112 is illustrated as coupled to the network 110.

For the sake of brevity, a number of conventional network components of the wireless communication network are omitted. The particular network components may vary depending on the implementation of the wireless communication network 102 (e.g., CDMA vs. GSM). However, these elements are known in the art and need not be described in greater detail herein.

Also illustrated in FIG. 1 are wireless communication devices 120-128. The wireless communication devices 120-128 are illustrative of many different types of conventional wireless communication devices capable of communicating with the base station 104 or other base stations (not shown) in the wireless communication network 102. Those skilled in the art will appreciate that the wireless communication network 102 may communicate using a variety of different signaling protocols. For example, the system 100 may be successfully implemented using, by way of example, CDMA, WCDMA, GSM, UMTS, 3G, 4G, LTE, and the like. The system 100 is not limited by any specific communication protocol for the wireless communication network 102.

As illustrated in FIG. 1, the wireless communication device 120 communicates with the base station 104 via a wireless network communication link 130. Similarly, the wireless communication device 122 communicates with the base station 104 via a wireless network communication link 132. Each of the wireless communication devices illustrated in FIG. 1 (e.g., the wireless communication devices 120-128) contain a conventional transmitter/receiver or transceiver components to permit conventional communication with the wireless communication network 102 via the base station 104 or other base station (not shown). Operational details of conventional network communication are known in the art and need not be described in greater detail herein.

In addition to the conventional network transceiver components, the jump-enabled wireless communication devices illustrated in FIG. 1 (e.g., the wireless communication devices 120-128) also include a second short-range transceiver to allow direct communication between the devices. This short-range communication is accomplished without reliance on the wireless communication network 102. Indeed, as will be described in greater detail below, the short-range transceivers in the mobile communication devices 120-128 permit the dynamic formation of a short-range communication network 116 that does not rely on the wireless communication network 102 provided by any wireless service provider. Thus, wireless communication devices can rely on the conventional wireless communication network 102 for some communications, but may also be part of the short-range communication network 116 formed between the mobile devices themselves. In the example of FIG. 1, the wireless communication device 120 communicates with the base station 104 via the wireless network communication link 130. Similarly, the wireless communication device 122 communicates with the base station 104 via the network wireless communication link 132. However, in addition, the wireless communication devices 120 and 122 may communicate directly with each other via a short-range communication link 134.

As illustrated in FIG. 1, the wireless communication device 124 is not in communication with the wireless communication network 102. However, the wireless communication device 124 can communicate directly with the wireless communication device 122 via a short-range wireless communication link 136. Also illustrated in FIG. 1 are the wireless communication devices 126-128. Although neither of these devices is in communication with the wireless communication network 102, the two devices are in direct communication with each other via a short-range wireless communication link 138. Thus, jump-enabled wireless communication devices must be in proximity with each other, but need not be in communication with the wireless communication network 102 or even in an area of wireless coverage provided by the wireless communication network.

The dynamic formation of one or more short-range networks 116 allows communication between the wireless communications devices 120-128 independent of the wireless communication network 102 even if the wireless communication network 102 is present and operational. The short-range communication network 116 advantageously allows communication in settings where the wireless communication network 102 is not present or in a situation where the wireless communication network is unavailable. For example, the wireless communication network 102 may be unavailable during a power outage or an emergency situation, such as a fire, civil emergency, or the like. In contrast, the short-range communication network 116 does not rely on any infrastructure, such as cell towers, base stations, and the like. As will be described in greater detail below, the short-range communication network 116 may be extended as jump-enabled wireless communication devices move throughout a geographic location.

Figure 2:
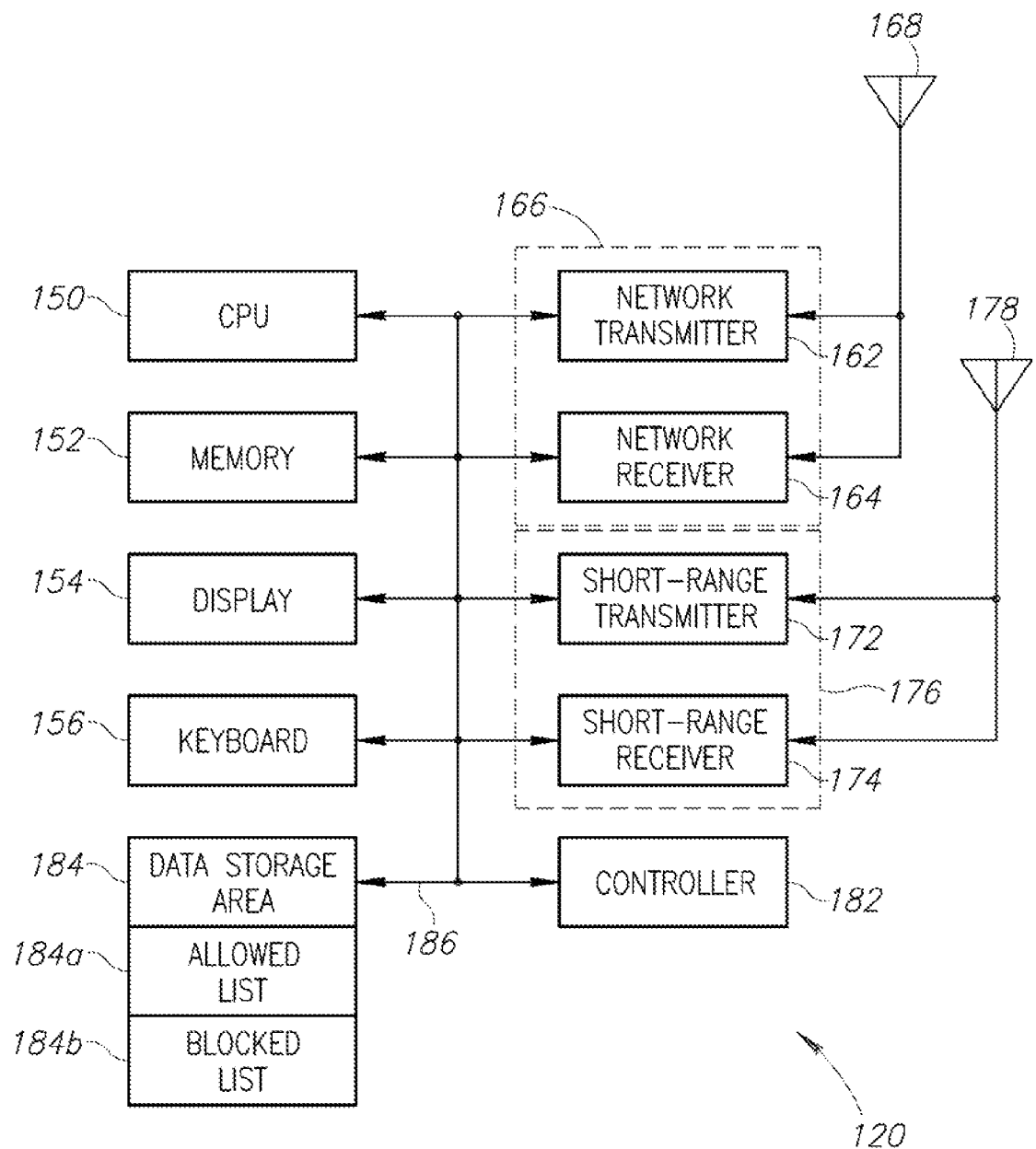
FIG. 2 is functional block diagram of one of the wireless communication devices of FIG. 1.

FIG. 2 is a functional block diagram illustrative of one of the wireless communication devices illustrated in FIG. 1 (e.g., the wireless communication device 120). The wireless communication device 120 includes a central processing unit (CPU) 150. Those skilled in the art will appreciate that the CPU 150 may be implemented as a conventional microprocessor, application specific integrated circuit (ASIC), digital signal processor (DSP), programmable gate array (PGA), or the like. The wireless communication device 120 is not limited by the specific form of the CPU 150.

The wireless communication device 120 in FIG. 2 also contains a memory 152. In general, the memory 152 stores instructions and data to control operation of the CPU 150. The memory 152 may include random access memory, ready-only memory, programmable memory, flash memory, and the like. The wireless communication device 120 is not limited by any specific form of hardware used to implement the memory 152. The memory 152 may also be integrally formed in whole or in part with the CPU 150.

The wireless communication device 120 of FIG. 2 also includes conventional components, such as a display 154 and a keypad or keyboard 156. These are conventional components that operate in a known manner and need not be described in greater detail. Other conventional components found in wireless communication devices, such as a USB interface, Bluetooth interface, camera/video device, infrared device, and the like, may also be included in the wireless communication device 120. For the sake of clarity, these conventional elements are not illustrated in the functional block diagram of FIG. 2.

The wireless communication device 120 of FIG. 2 also includes a network transmitter 162 such as may be used by the wireless communication device 120 for the conventional wireless communication network with the base station 104 (see FIG. 1). FIG. 2 also illustrates a network receiver 164 that operates in conjunction with the network transmitter 162 to communicate with the base station 104. In a typical embodiment, the network transmitter 162 and network receiver 164 share circuitry and are implemented as a network transceiver 166. The network transceiver 166 is connected to an antenna 168. The network transceiver 166 is illustrated as a generic transceiver. As previously noted, the mobile communication devices (e.g., the mobile communication devices 120-128) may be implemented in accordance with any known wireless communication protocol including, but not limited to, CDMA, WCDMA, GSM, UMTS, 3G, 4G, WiMAX, LTE, or the like. Operation of the network transceiver 166 and the antenna 168 for communication with the wireless communication network 102 is well-known in the art and need not be described in greater detail herein.

The wireless communication device 120 of FIG. 2 also includes a short-range transmitter 172 that is used by the wireless communication device 120 for direct communication with other jump-enabled wireless communication devices (e.g., the wireless communication device 122 of FIG. 1). FIG. 2 also illustrates a short-range receiver 174 that operates in conjunction with the short-range transmitter 172 to communicate directly with other jump-enabled wireless communication devices (e.g., the wireless communication device 122 of FIG. 1). In a typical embodiment, the short-range transmitter 172 and short-range receiver 174 are implemented as a short-range transceiver 176. The short-range transceiver 176 is connected to an antenna 178. In an exemplary embodiment, the antennas 168 and 178 may have common components are implemented as a single antenna.

FIG. 2 also illustrates a controller 182 and a data storage area 184. As will be described in detail below, the controller 182 controls the exchange of data between wireless communication devices that become part of the short-range communication network 116. The data storage 184 contains user profile data and messaging data that will be exchanged between wireless communication devices in the short-range communication network 116. The data storage area 184 may be implemented as any convenient data structure. As will be described in greater detail below, the data storage area 184 contains data (e.g., messages, personal profile information of contacts, a geographical location tag for each contact, and the like) that will be exchanged between wireless communication devices. The data may be stored as a simple list, part of a database, or any other convenient data storage structure. The user profile can include a broad array of information such as user name, nickname, age, sex, education and work background, hobbies, food preferences (love sushi, Hunan, and Mediterranean food, etc.), and the like. In one embodiment, described in U.S. application Ser. No. 12/397,225, filed on Mar. 3, 2009, now U.S. Pat. No. 7,970,351, two wireless devices may exchange portions of user profile data to determine whether there is a suitable match between the users. If the phones determine that there is a suitable match based on the user profiles, an alert signal may be generated to indicate to the individual users that there is a person nearby that they should meet. In another embodiment, user profile data may be used in a business venue to determine appropriate marketing and advertisement data based on the user profile.

The data storage area 184 also stores a list of other nearby wireless communication devices that form part of the short-range wireless communication network 116. In addition, the data storage area 184 may include an Allowed List 184*a* and a Blocked List 184*b* in connection with device authentication. As will be described in greater detail below, the Allowed List 184*a* contains identities of nearby wireless communication devices that have been verified while the Blocked List 184*b* includes a list of nearby wireless communication devices that have been determined not to be authentic or which the user, a their own discretion, has decided to block.

The various components illustrated in FIG. 2 are coupled together by a bus system 186. The bus system may include an address bus, data bus, power bus, control bus, and the like. For the sake of convenience, the various busses in FIG. 2 are illustrated as the bus system 186.

In one embodiment, when the jump-enabled wireless communication device 120 comes within range of any other jump-enabled wireless communication device (e.g., the wireless communication device 122 of FIG. 1), it establishes a short-range wireless communication link (e.g., the short-range wireless communication link 134).

In an exemplary embodiment, the short-range transceiver 176 may be designed for operation in accordance with IEEE standard 802.11, sometimes referred to as WiFi. Many modern wireless communication devices are equipped with WiFi and may be readily upgraded to support the functionality described herein. Because the wireless communication devices 120-128 all include WiFi capability, short-range communication networks 116 may be formed even though the wireless communication devices may be designed to operate with incompatible wireless communication networks 102. For example, the wireless communication device 122 may be configured for operation with a GSM implementation of the wireless communication network 102. The wireless communication device 124 may be configured for operation with a CDMA implementation of a wireless communication network 102. Even though the wireless communication devices 122-124 are incompatible with respect to the respective wireless communication networks 102, the wireless communication devices 122-124 may still communicate directly with each other via the short-range communication network 116. Thus, the wireless communication devices 120-128 may operate compatibly to form the short-range communication networks 116 even though the network transceivers 166 (see FIG. 2) may operate with different incompatible wireless communication networks 102.

Various techniques for establishing the short-range communication network 116 (see FIG. 1) are described in U.S. application Ser. No. 12/397,225 filed on Mar. 3, 2009, now U.S. Pat. No. 7,970,351, U.S. application Ser. No. 12/616,958 filed on Nov. 12, 2009, U.S. application Ser. No. 12/958,296, filed on Dec. 1, 2010, and U.S. application Ser. No. 13/093,988 filed on Apr. 26, 2011, the entire disclosures and content of which are hereby incorporated by reference in their entirety.

As will be discussed in greater detail below, the system 100 goes beyond some of the conventional operation of WiFi standards to permit a large number of wireless communication devices to communicate directly with each other. In one embodiment, a local hot spot is used to initiate the formation of the short-range communication network 116. Once established, the short-range communication network 116 may continue to exist even if the hot spot (or group owner) is no longer present. In yet another alternative embodiment, described below, the wireless communication devices may be pre-programmed to utilize a common SSID, IPrange, and port to spontaneously form a short-range communication network 116 even in the absence of any hot spot.

In an exemplary embodiment of the system 100, each wireless communication device (e.g., the wireless communication devices 120-128) transmits a beacon signal with the same SSID, such as the SSID "JUMMMP" to identify the device as a jump-enabled wireless communication device. In addition, the beacon frame includes several other data fields such as a media access layer (MAC) address for source and destination. In the beacon frame, the destination MAC address is set to all ones to force other wireless communication devices to receive and process the beacon frame. The beacon frame used in the system 100 may also include conventional elements, such as a time stamp used for synchronization with other wireless devices, information on supported data rates, parameter sets that indicate, for example, transceiver operational parameters such as the IEEE 802.11 channel number and signaling method such as operation at the physical layer (PHY) and operation in a direct frequency spectrum (DSSS)

or a frequency hopping spread spectrum (FHSS) operational modes. These conventional WiFi parameters are known in the art and need not be described in greater detail herein.

In addition, since there is no access point, all jump-enabled wireless communication devices take on the responsibilities of the MAC layer that controls, manages, and maintains the communication between the jump-enabled wireless communication devices by coordinating access to the shared radio channel and the protocols that operate over the wireless medium. In an exemplary embodiment, the MAC is implemented in accordance with IEEE 802.2. At the PHY layer, the transceiver may operate in a DSSS or a FHSS operational mode. Alternatively, the PHY layer may be implemented using infrared transceivers. The IEEE 802.11 standard defines a common operation whether devices are using the ad hoc or the infrastructure mode. The use of the ad hoc mode only affects protocols, so there is no impact on the PHY layer. Thus, the wireless communication device 120 may operate under IEEE 802.11a at 5 gigahertz (GHz) under IEEE 802.11b/g at 2.4 GHz, or IEEE 802.11n, which operates at both 2.4 GHz and 5 GHz. Those skilled in the art will appreciate that the wireless communication device of the system 100 may be readily adapted for operation with future versions of IEEE 802.11.

In an alternative embodiment, the wireless communication devices 120-128 may be configured in accordance with IEEE WiFi Direct standards. WiFi Direct allows any wireless communication device in the short-range communication network 116 to function as the group owner. WiFi Direct simplifies the process of establishing a communication link. For example, the WiFi protected set up allows a communication link to be established by entering a PIN or other identification or, simply pressing a button. As will be described herein, the jump-enabled wireless communication devices actively seek to establish links with other jump-enabled devices to automatically establish a short-range communication network 116.

Figure 3:
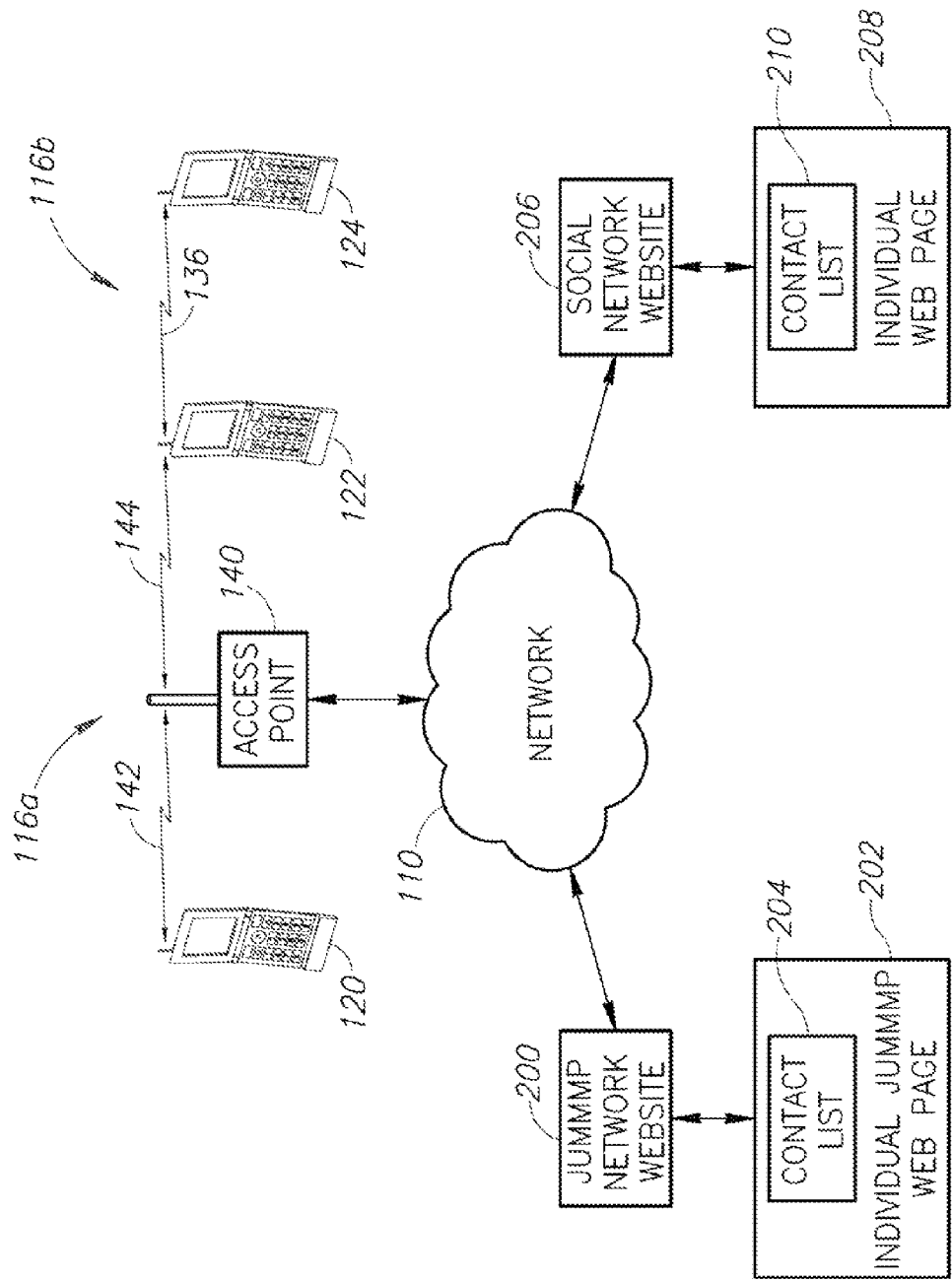
FIG. 3 illustrates an embodiment of the system of FIG. 1 using an access point as part of a network.

In yet another alternative embodiment, illustrated in FIG. 3, the jump-enabled wireless communication devices (e.g., the wireless communication devices 120-122) may communicate with an access point 140, such as a WiFi base station, WAP, wireless router, or the like. As will be described in greater detail below, a wireless communication device (e.g., one of the wireless communication devices 120-124) may function as the access point 140 to permit others of the wireless communication devices in the short range communication network 116 to access the network 110 via the wireless communication device serving as the access point. FIG. 3 illustrates a wireless communication link 142 established between the access point 140 and the wireless communication device 120. Similarly, the wireless communication device 122 establishes a wireless communication link 144 with the access point 140. Thus, a short-range communication network 116a is formed in conjunction with the access point 140. To assist in a better understanding of the present disclosure, short-range communication networks will be generally referred to by the reference 116. Specific examples of short-range communication networks will be referred to by the reference 116 and an alphabetic identifier (e.g., the short-range communication network 116a in FIG. 3).

Depending on the physical proximity of the wireless communication devices 120-124, there may be one or more short-range communication networks 116 formed. In the example of FIG. 3, the wireless communication devices 120-122 are both within range of the access point 140. Therefore, the first short-range communication network 116a can be formed with the wireless communication devices 120-122 and the access point 140.

The wireless communication device 124 is within range of the wireless communication device 122, but is not within range of the access point 140. In one embodiment, the wireless communication device 124 may be become part of the short-range communication network 116a via the wireless communication device 122. In this embodiment, the wireless communication device 122 functions as a "repeater" or relay to relay information between the wireless communication device 124 and other parts of the short-range communication network 116a. In another embodiment, a second short-range communication network 116b is formed with the wireless communication devices 122-124. In this exemplary embodiment, the wireless communication device 122 is part of both short-range communication networks 116a-116b. The wireless communication device 122 may simultaneously be a member of both short-range communication networks 116a-116b or may be logically connected to both short-range communication networks 116a-116b by alternately switching between the short-range communication networks 116a-116b.

The access point 140 is coupled to the network 110 in a conventional manner. This can include a wired or wireless connection directly to the network 110 or via an intermediate network gateway, such as those provided by an Internet Service Provider (ISP). FIG. 3 also illustrates a JUMMMP Network website 200, which may support an individual web page 202 for each member (e.g., an individual person, business, organization, etc.) of the JUMMMP Network. FIG. 3 also illustrates a generic conventional social network website 206, which may support an individual web page 208 for each member of the social network. The JUMMMP network website 200 and social network website 206 are each coupled to the network 110. Although illustrated in FIG. 3 as two separate network websites, those skilled in the art will appreciate that the JUMMMP website 200 effectively functions as a social network website. Similarly, the JUMMMP website technology can be incorporated into existing social network websites. Thus, the two separate websites illustrated in FIG. 3 can effectively be combined into a single website.

As discussed in detail in co-pending U.S. application Ser. No. 12/616,958, filed on Nov. 12, 2009 and assigned to the assignee of the present application, the user of a jump-enabled wireless communication device (e.g., the wireless device 120) may use the web-browsing capability of the wireless communication device to access the individual JUMMMP web page 202 for the individual with whom contact has just been made to learn more about that individual. Alternatively, the user of a jump-enabled wireless communication device (e.g., the wireless device 120) may use the web-browsing capability of the wireless communication device to access the user's own individual JUMMMP web page 202 to store information for the individual with whom contact has just been made. A contact list 204, which is typically a portion of the individual JUMMMP web page 202 is configured to store contact information. Similarly, the individual web page 208 of the social network 206 can include a contact list 210 to store contact information. In one embodiment, the contact information may include a user profile exchanged along with individual messages between users. As will be discussed in greater detail below, the user profile can include user name and preferences, as well as information about the specific exchange of messages. For example, the user profile can include the date and time at which messages were exchanged, geo-location data (e.g., latitude and longitude) of the sender of a message, and the like, and can also be stored as user profile data in the contact list 204. Applications for the profile data are described in greater detail below.

The wireless communication devices 120-128 (see FIG. 1) generally have sufficient memory capacity to temporarily store contact information. In an exemplary embodiment, the wireless communication device (e.g., the wireless communication device 120) can temporarily store new contact information until access to the network 110 becomes available at a later time. In addition, the wireless communication device 120 can store designated contact information (e.g., "Favorites") on a more permanent basis. Long-term storage of contact information requires access to the network 110. In the embodiment of FIG. 1, access to the network 110 may be provided via the base station 104 in a conventional manner. The wireless communication device 122 may access the network 110 by communicating directly with the base station 104. In the embodiment of FIG. 3, access to the network 110 may be provided via the access point 140, as described above. For example, the wireless communication device 122 in FIG. 1 may access the network 110 by communicating directly with the access point 140 via the short-range communication link 144. Alternatively, the wireless communication device 122 can access the network 110 and the JUMMMP network website 200 via the wireless communication link 132 to the base station 104. Network access via the gateway 108 is well known in the art and need not be described in greater detail herein.

In an alternative embodiment, access to the network 110 may be provided via another jump-enabled wireless communication device. For example, in FIG. 1, the wireless communication device 122 can communicate with the base station 104 via the wireless communication link 132 while the wireless communication device 124 cannot communicate directly with the base station. However, the wireless communication device 124 is in proximity with the wireless communication device 122 and can communicate with the wireless communication device 122 via the wireless communication link 136 as part of the short-range communication network 116. In this embodiment, the wireless communication device 124 can use the wireless communication device 122 as a repeater or relay to allow the wireless communication device 122 to access the network 110 via the wireless communication device 122 and the base station 104.

Similarly, in the embodiment of FIG. 3, the wireless communication devices 120-122 can communicate directly with the access point 140 via the wireless communication links 142-144, respectively. The wireless communication devices 120-122 can also communicate with each other via the access point 140 thus forming the short-range communication network 116a. As seen in FIG. 3, the wireless communication device 124 cannot communicate directly with the access point 140. However, the wireless communication device 124 is in proximity with the wireless communication device 122 and can communicate with the network 110 via the wireless communication device 122 and the access point 140.

Figure 4:
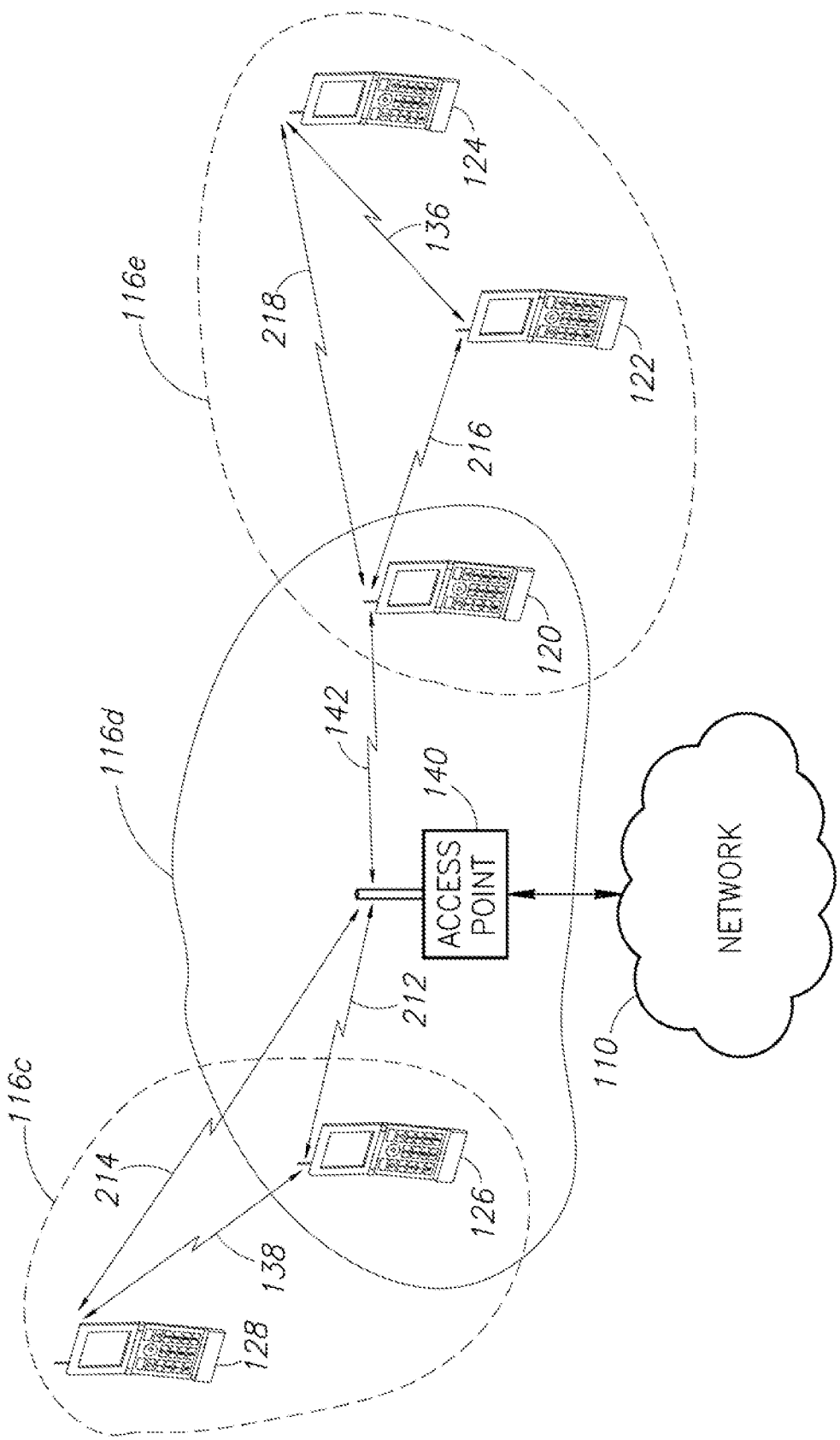
FIG. 4 illustrates a dynamic network topology using an access point.

As previously noted, the system 100 provides for the dynamic formation and rapid change in the topography of the short-range communication networks 116. For example, FIG. 1 illustrates a first short-range communication network 116 formed with the wireless communication devices 120-124 and a second short-range communication network 116 formed between the wireless communication devices 126-128. FIG. 4 illustrates the dynamic nature of the wireless communication networks 116. For example, if the wireless communication device 128 is initially within range of the wireless communication device 126, but out of range of the access point 140, the wireless communication devices 126-128 may form a short-range communication network 116c using the short-range communication link 138. If the wireless communication device 126 comes within range of the access point 140, a wireless communication link 212 is formed. In that event, the wireless communication device 126 may become part of a short-range communication network 116d formed between the access point 140 and the wireless communication devices 120 and 126. At this particular moment in time, the mobile communication device 126 may be part of both the short-range communication network 116c and the short-range communication network 116d. As discussed above, the wireless communication device 126 may actually be part of both the short-range communication networks 116c-116d or may logically be connected to both the short-range wireless communication networks by switching back and forth between the short-range communication networks 116c-116d. The logical switching between the short-range communication networks 116c-116d is transparent to the user. Other examples of the short-range communication network 116 are described below in which no access point 140 is present.

Alternatively, the wireless communication device 128 may become part of the short-range communication network 116d using the wireless communication device 126 as a relay to the access point 140. If, at a later time, the wireless communication device 128 comes within range of the access point 140, a wireless communication link 214 is formed there between. At that point in time, the short-range communication network 116c effectively ceases to exist since the wireless communication devices 126-128 are now part of the short-range communication network 116d.

The wireless communication device 120 may be part of the short-range communication network 116d by virtue of the short-range communication link 142 coupling the wireless communication device 120 to the access point 140. If the wireless communication device 120 comes within range of the wireless communication devices 122-124, wireless communication links 216-218 will be formed to couple the wireless communication devices 120-124 and thereby dynamically form a short-range communication network 116e. At this point in time, the wireless communication device 120 may simultaneously be part of the short-range communication network 116d and the short-range communication network 116e. Alternatively, the wireless communication devices 122-124 may become part of the short-range communication network 116d via the wireless communication device 120.

If the wireless communication device 120 subsequently moves out of range of the access point 140, the wireless communication link 142 is broken. Therefore, there will no longer be an overlap between the short-range communication networks 116d-116e. The wireless communication device 120 would remain part of the short-range communication network 116e so long as it remains within range of the wireless communication device 122, the wireless communication device 124, or both. Thus, those skilled in the art will appreciate that short-range communication networks are dynamically formed, modified, and dissolved as the wireless communication devices move in and out of range with each other and central points, such as the access point 140. Furthermore, if the wireless communication device 120 comes back into range of the access point 140, the wireless communication link 142 can be reestablished. When this happens, all prior communications from the short-range communication network 116e will be transferred to the short-range communication networks 116d and 116c (and vice-versa) through the re-echoing function described above. That is, the various wireless communication devices will resynchronize the data in the data storage area 184 (see FIG. 2). Those skilled in the art will also appreciate that the short-range communication networks 116 may be formed, modified, and dissolved without the presence of the access point 140.

FIG. 4 illustrates the wireless communication device 120 as a key component in the short-range communication network 116e because it connects the wireless communication devices 122-124 to the access point 140. If the wireless communication device 120 suddenly moved out of range of the access point and/or the wireless communication devices 122-124 that connection may be broken. Similarly, if the user of the wireless communication device 120 suddenly turned off the device, the link between the short-range communication network 116e and the access point 140 would disappear. The wireless communication devices 122-124 still communicate with each other via the wireless communication link 136 and will still search for other wireless communication devices with which to connect. In addition, either of the wireless communication devices 122-124 will attempt to find the access point 140 or a hot spot from which either of the wireless communication devices may access the network 110.

FIG. 4 illustrates a sparse network with only five wireless communication devices. However, those skilled in the art can appreciate that there may be a very large number of wireless communication devices in proximity with each other. For example, if FIG. 4 is illustrative of a large shopping mall, there may be hundreds of wireless communication devices within the mall. Thus, the short-range communication networks 116 may be large and extensive. There may be a large number of wireless communication devices that are simultaneously present in two or more short-range communication networks 116. In addition, many wireless communication devices would provide overlapping coverage with multiple short-range communication networks 116. In this scenario, the entire mall and surrounding parking area could be effectively covered by a mesh network comprising dozens or hundreds of short-range communication networks 116. Thus, in the situation illustrated in FIG. 4 where the wireless communication device 120 is turned off or moved out of range of other wireless communication devices is less likely to cause the total isolation of the short-range communication network 116e. If the wireless communication device 120 were suddenly removed, either by powering down or by the departure from the area, many other wireless communication devices (not shown) in the same proximity would be able to replace the connectivity between the short-range communication network 116e and the access point 140.

Whenever a wireless communication device (e.g., the wireless communication device 124) comes within range of other wireless communication devices, a short-range wireless communication network (e.g., the short-range wireless communication network 116e), the wireless communication devices exchange message data with each other to thereby synchronize message data in the data storage area 184 (see FIG. 2). At the end of the synchronization process, the data storage area 184 of each wireless communication device will contain the same message data, although messages may not be in the same sequence. In the example described above, when the wireless communication device 124 comes within range of the wireless communication device 120 and/or the wireless communication device 122, the wireless communication links 136 and 218 are formed. Because the wireless communication device 124 has just joined the short-range communication network 116e, the data storage area 184 of the wireless communication device 124 will not be synchronized with the data storage area of other wireless communication devices in the short-range communication network 116e. During the synchronization process, the wireless communication device 124 transmits message data in its data storage area 184. The wireless communication devices 120 and 122 receive the message data. The controller 182 (see FIG. 2) in each wireless communication device receives the message data and merges the messages with the message data already stored within the data storage area 184 of the wireless communication devices 120 and 122, respectively. The controller 182 in each of the wireless communication devices may also eliminate duplicate messages. In this manner, each wireless communication device manages the message data within its data storage area 184.

As part of the synchronization process, the wireless communication devices 120 and 122 may also transmit the message data within their respective data storage areas 184. The wireless communication device 124 receives the messages from the wireless communication devices 120 and 122 and merges the newly received messages in the data storage area 184 of the wireless communication device 124. As described above, the controller 182 (see FIG. 2) of the wireless communication device 124 may eliminate duplicate messages within its data storage area 184. Following this synchronization process, all wireless communication devices in the short-range communication network 116e will have identical messages.

In an exemplary embodiment, the messages may be categorized as Public Messages, Group Messages, Direct Messages, and Status Messages. Public Messages may be transmitted to anyone within range of the wireless communication device (e.g., the wireless communication device 120). This may include emergency messages, messages broadcast from a retailer, and the like. Group Messages are intended for a specific group or organization, such as a scout group or employees of a particular company or any formed group. Direct Messages are private messages intended for a specific individual. In addition, the wireless communication device 120 may transmit Status Messages, which can include, by way of example, a list of other wireless communication devices in the particular short-range communication network 116, a list of recent wireless communication devices in the particular short-range communication network, a list of other short-range communication networks in which the wireless communication device was recently a member, or the like. The data message process described above can include one or more of these message categories. Other message categories may be created as necessary.

U.S. patent application Ser. No. 13/093,998, entitled "SYSTEM AND METHOD FOR MANAGEMENT OF A DYNAMIC NETWORK USING WIRELESS COMMUNICATION DEVICES," FILED ON Apr. 26, 2011, and incorporated by reference in its entirety, provides additional details of the message exchange process. As described therein, the Public and Group Messages may be contained in one file and all Direct Messages contained in a separate file. The messages have a main header and individual message headers. The main header may include, by way of example, the date/time of the last modification, message count, the date/time of the last synchronization and the user name of the wireless communication device with which the last synchronization was performed. This information may help maintain synchronization between wireless devices.

The message data may include, but is not limited to, text message data, audio data, video data, multimedia data, or the like. As those skilled in the art will appreciate, Public Messages may be received and processed by any wireless communication device. In contrast, Group Messages may only be processed by a member of the designated group, while a Direct Message may only be processed by the individual wireless communication device for whom the message is intended.

Synchronization may occur directly between the wireless communication devices or via the access point 140 illustrated in FIG. 4. For example, message synchronization can occur between the wireless communication device 120 and the wireless communication device 126 using the access point 140. In addition, as will be described in greater detail below, wireless communication devices can carry message data as they move from one short-range communication network to another.

In another embodiment, a retail business may broadcast Public Messages to nearby wireless communication devices. In an exemplary embodiment, the retail facility can set up a wireless access point (e.g., the wireless access point 140 in FIG. 3) to establish a short-range communication network 116. For example, a retail facility in a shopping mall can transmit advertisement messages to nearby wireless communication devices. In a typical embodiment, these would be Public Messages that are freely relayed from one wireless communication device to another and from one short-range wireless communication network 116 to another. Using this form of message distribution, an advertisement from a retail facility will soon be disseminated to all wireless users in the area. The advertisements may take the form of text messages or any other data message described above.

In another aspect, an individual user may register with a business. Whenever the user comes within range of the short-range communication network 116 associated with the retail business, message data may be exchanged thus enabling the business to identify a particular user that is nearby. In this embodiment, the retail business may send a private advertisement message to the particular user. The private advertisement may be customized for the user based on a number of factors, such as the user's profile (e.g., the sex, age, and interests of the user), prior shopping patterns, or the like. It can also be based on statistical and history data that the retail business has collected on the user in one or more short-range communication networks 116 in the region around the retail business. For example, if a particular user has registered with a restaurant and comes within range of the short-range communication network 116 of that restaurant at a subsequent time after registration, the restaurant can send a private advertisement message to entice that user into the restaurant by offering a discount on a meal previously purchased by that user. If the user is a sports enthusiast, a sports bar could send a message that a particular sporting event (e.g., the user's college football team) is ongoing and offer a discount on a meal. In this manner, highly customized advertisements may be sent to individual users.

In some situations, the user may not be within range of the short-range communication network 116 of the restaurant, but may still be nearby. Because the wireless communication devices in the various short-range communication networks 116 relay messages, any message from a particular user may be relayed to the retail business via one or more short-range communication networks 116. Thus, a business at one end of a mall may detect the arrival of a particular user at the opposite end of the mall and still transmit a customized advertisement message to that user.

Figure 5:
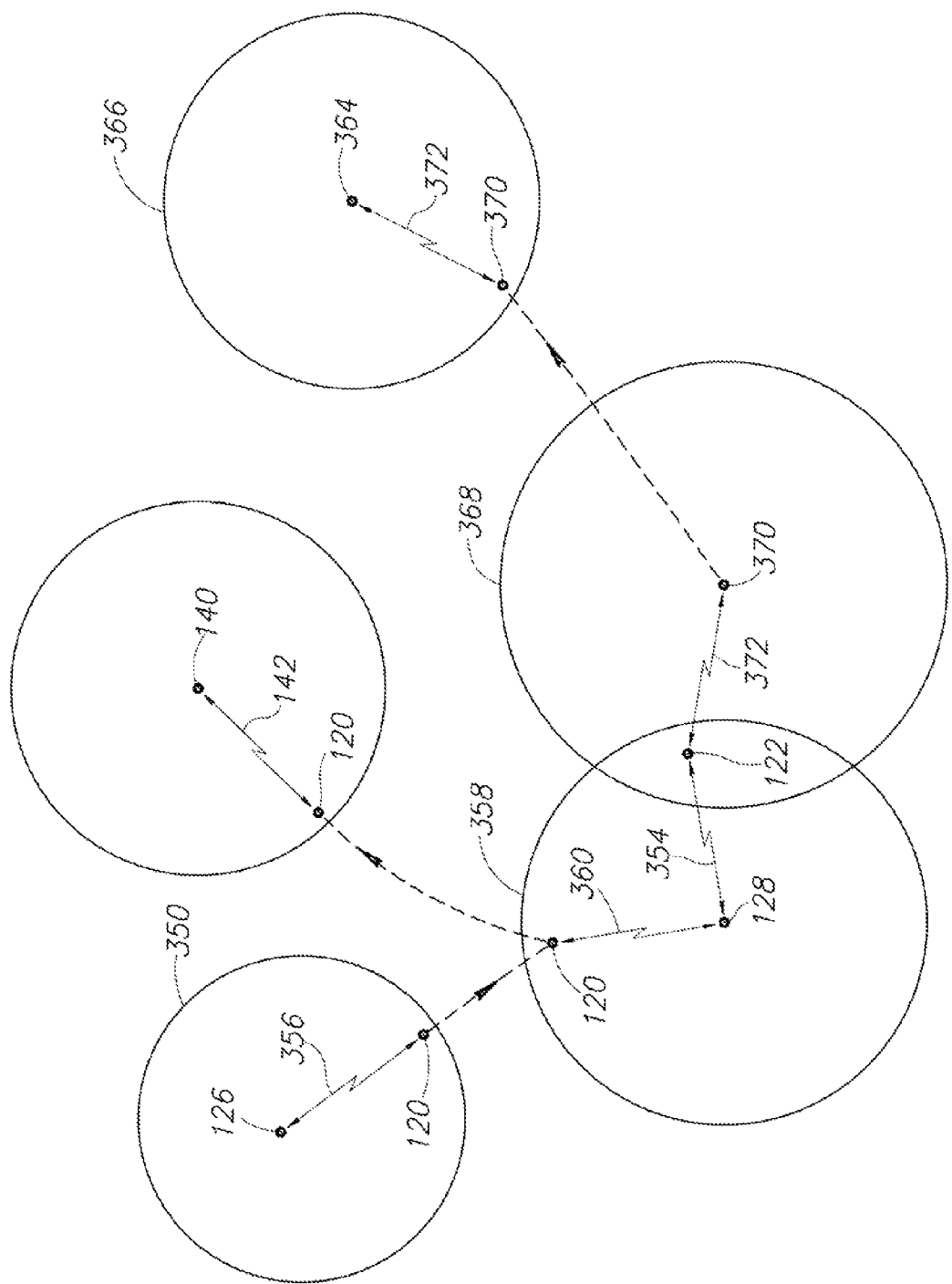
FIG. 5 illustrates the dissemination of information using an access point.

FIG. 5 illustrates the distribution of message data throughout multiple short-range communication networks 116. For the sake of simplicity, the wireless communication devices are illustrated in FIG. 5 merely as dots with associated reference numbers. Furthermore, the area of coverage of wireless communication devices may be illustrated as a circle in FIG. 5. Those skilled in the art will appreciate that the circle is a two-dimensional representation of the area of coverage of a particular wireless communication device. Those skilled in the art will appreciate that the wireless communication device transmits in three-dimensions and that the arc of coverage may be altered by natural or manmade barriers (e.g., terrain, plants, trees, walls, buildings, and the like). The area of coverage may even alter as the wireless communication device moves from one room to another within a building.

FIG. 5 illustrates a scenario in which wireless communication devices travel from one short-range communication network 116 to another and thereby distribute data stored in the data storage area 184 of the traveling wireless communication device. In FIG. 5, the wireless communication device 126 may generate a Direct Message for a wireless communication device 364 having an area of coverage 366 that does not overlap with the communication range 350 of the wireless communication device 126. In the example illustrated in FIG. 5, the Direct Message is contained within the data storage area 184 of the wireless communication device 126 possibly along with other messages. The Direct Message may have been generated by the wireless communication device 126 or may have been received by the wireless communication device 126 from another wireless communication device (not shown). The wireless communication device 126 uses the wireless communication link 356 to exchange message data with the wireless communication device 120. In the example illustrated in FIG. 5, the wireless communication device moves out of the communication range 350 and into the communication range 358 of the wireless communication device 128. In the present example, there may be a period where the wireless communication device 120 is not within range of any short-range communication network 116. However, as the wireless communication device 120 moves within the coverage range 358, it establishes the wireless communication link 360 with the wireless communication device 128 and exchanges message data therewith in the manner described above. In turn, the wireless communication device 128 exchanges data, including the Direct Message carried by the wireless communication device 120, with the wireless communication device 122 using the wireless communication link 354.

As FIG. 5 illustrates, the wireless communication device 122 is within a communication range 368 of a wireless communication device 370. The wireless communication device 122 exchanges data, including the data originally carried by the wireless communication device 120, to the wireless communication device 370 using a wireless communication link 372. In the example of FIG. 5, the wireless communication device 370 moves out of range of the wireless communication device 122 and out of the communication range 358. At some later point in time, the wireless communication device 370 moves within the communication range 366 of the wireless communication device 364, which is the intended recipient of the Direct Message originally stored in the data storage area 184 of the wireless communication device 126. At this point, the wireless communication device 370 establishes a communication link 372 with the wireless communication device 364. The wireless communication device 370 exchanges data in the data storage area 184 (see FIG. 2) with the wireless communication device 364. As previously discussed, the wireless communication device 370 is carrying the data originated by the wireless communication device 126. This is true even though the wireless communication device 370 may have been out of range of any wireless communication devices for some period of time. Following the data exchange between the wireless communication devices 370 and 364, the wireless communication device 364 now includes the data originally stored in the data storage area 184 of the wireless communication device 126. Thus, it can be appreciated that the dynamic and fluid nature of the short-range communication networks 116 allows data to be exchanged between wireless communication devices that are in range of each other and for data to be carried from one short-range communication network 116 to another.

The example illustrated in FIG. 5 shows only a single wireless communication device 120 moving from the communication range 350 to the wireless communication device 358, the single wireless communication device 370 moving from the area of coverage 368 to the area of coverage 366. However, those skilled in the art will appreciate that this scenario can be repeated by dozens of wireless communication devices. Using the example of a shopping mall, data may be originally exchanged between dozens of wireless communication devices within a single short-range communication network 116. As each of those dozens of wireless communication devices fan out, they temporarily become members of other wireless communication devices and disseminate the data stored in their respective data storage areas 184 to potentially dozens of other wireless communication devices within the new short-range communication network. This form of "viral" distribution can effectively provide a mesh network in areas where there is a large accumulation of wireless communication devices. Thus, the data from the wireless communication device 126 in the example of FIG. 5 may, in fact, be delivered to the wireless communication device 364 through a multitude of pathways.

FIG. 5 illustrates the movement of mobile communication devices from one short-range communication network 116 to another. Those skilled in the art will appreciate that the distances between short-range communication networks 116 may be considerable. Messages could be relayed from one wireless communication device to another and from short-range communication device to another. When a wireless communication device is temporarily out of range of a short-range communication network 116, that wireless device will carry the messages stored in the data storage area 184 (see FIG. 2) until it comes in contact with another short-range communication network. At that point, the message data will be transferred to other wireless communication devices in that short-range communication network 116 and each of those wireless communication devices will carry the message further until it reaches its intended recipient. Thus, a message could be carried a few feet to its intended destination or a few hundred miles to its destination.

When a large number of conventional wireless communication devices are in physical proximity, such as a sporting event or even in rush-hour traffic, a conventional service provider network (e.g., the base station 104 in FIG. 1) is often overwhelmed because many wireless communication devices are attempting to connect to the same base station. Thus, too many conventional mobile communication devices in proximity can be a debilitating situation. In contrast, the system 100 can actually take advantage of the presence of a large number of wireless communication devices because a large number of devices will facilitate the movement of messages independent of the conventional service provider network. Thus, the system 100 can facilitate rather than debilitate communication in the presence of a large number of mobile communication devices. For example, a message generated by one user in rush-hour traffic will be quickly relayed to many other wireless communication devices in the same rush-hour traffic. Thus, messages may move quickly up and down a roadway. In addition, some of the wireless communication devices will become part of short-range communication networks in other locations near the roadway. Thus, the message spreads up and down the roadway using the wireless communication devices in automobiles on the roadway and moves away from the roadway as automobiles enter and leave short-range communication networks adjacent to or near the roadway. The system 100 could move a message from, by way of example, Orange County to Los Angeles using a variety of short-range communication networks in the manner described above.

As previously discussed, messages may be categorized in several categories, such as Public Messages, Group Messages, Direct Messages, and Status Messages. In addition, a priority category may be created to disseminate emergency messages. The example of FIG. 5 illustrates one embodiment in which an emergency message may be generated by the wireless communication device 126 or received by the wireless communication device 126 from another wireless communication device (not shown). The emergency message can be disseminated to the recipient (e.g., the wireless communication device 364 in FIG. 5) in the manner described above. One distinction between an emergency message and other message types is that an emergency message will not be deleted from the data storage area of any wireless communication device until "Message Received" confirmation message is received or until some instruction is received to delete the emergency message from the data storage area 184. In this embodiment, the emergency message may be distributed in the same fashion described above. When the emergency message reaches its intended recipient (e.g., the wireless communication device 364), the recipient wireless communication device generates a "Message Received" or message receipt and transmits it back to the originator (e.g., the wireless communication device 126 or wireless communication device not shown). Because of the dynamic nature of the short-range communication networks 116, the Message Received will likely be distributed via a different pathway with a different set of wireless communication devices in different sets of short-range communication networks 116. As the Message Received is distributed, each wireless communication device uses the Message Received to delete the emergency message from the data storage area 184. If a particular wireless communication device never received the emergency message, the Message Received may be ignored. Alternatively, the Message Received message can be delivered via the access point 140 or the network 110 (see FIG. 1). For example, the wireless communication device 364 may receive the emergency message and generate the Message Received message for transmission via one or more short-range communication networks 116. Additionally, the wireless communication device 364 may send the Message Received message via the network 110. The Message Received message may be delivered to the network 110 via the access point 140 (see FIG. 3) or via another wireless communication device having network access or via a base station (e.g., the base station 104 of FIG. 1) and a gateway (e.g., the gateway 108 in FIG. 1). The Message Received receipt can be delivered to the originator of the emergency message or delivered to the individual web page 208 or individual JUMMMP web page 202 (see FIG. 3) to notify the message originator that the message has been received.

A different emergency message scenario is also illustrated in FIG. 5. In this scenario, the system 100 may use the network 110 (see FIG. 1) to further disseminate an emergency message. In FIG. 5, the wireless communication device 120, which has already migrated from the communication area 350 to the communication area 358 now migrates again and comes within range of the access point 140. As described above, the wireless communication link 142 is established between the wireless communication device 120 and the access point 140. In one embodiment, the access point 140 may be part of one or more short-range communication networks 116 and further disseminate the emergency message in a conventional manner. Alternatively, the access point 140 may be a gateway to the network 110 to permit dissemination of the emergency message via the network 110. In this embodiment, the emergency message may require additional headers to identify the recipient. Thus, the wireless access point 140 and network 110 may be used to disseminate the emergency message.

Figure 6:
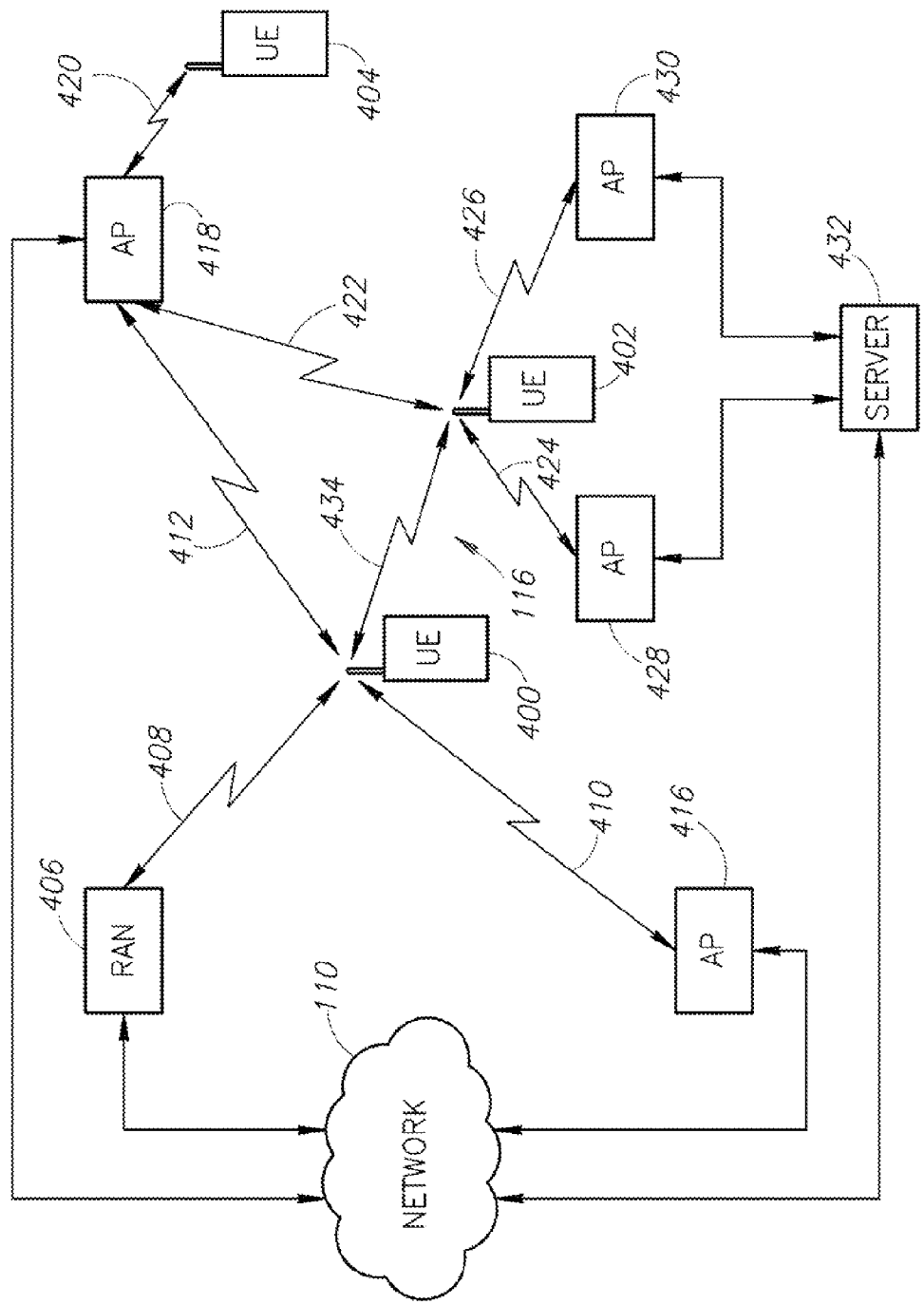
FIG. 6 is an example network architecture of a dynamic network illustrating communication between user equipment, wireless access points, and a wireless service provider network.
Figure 7:
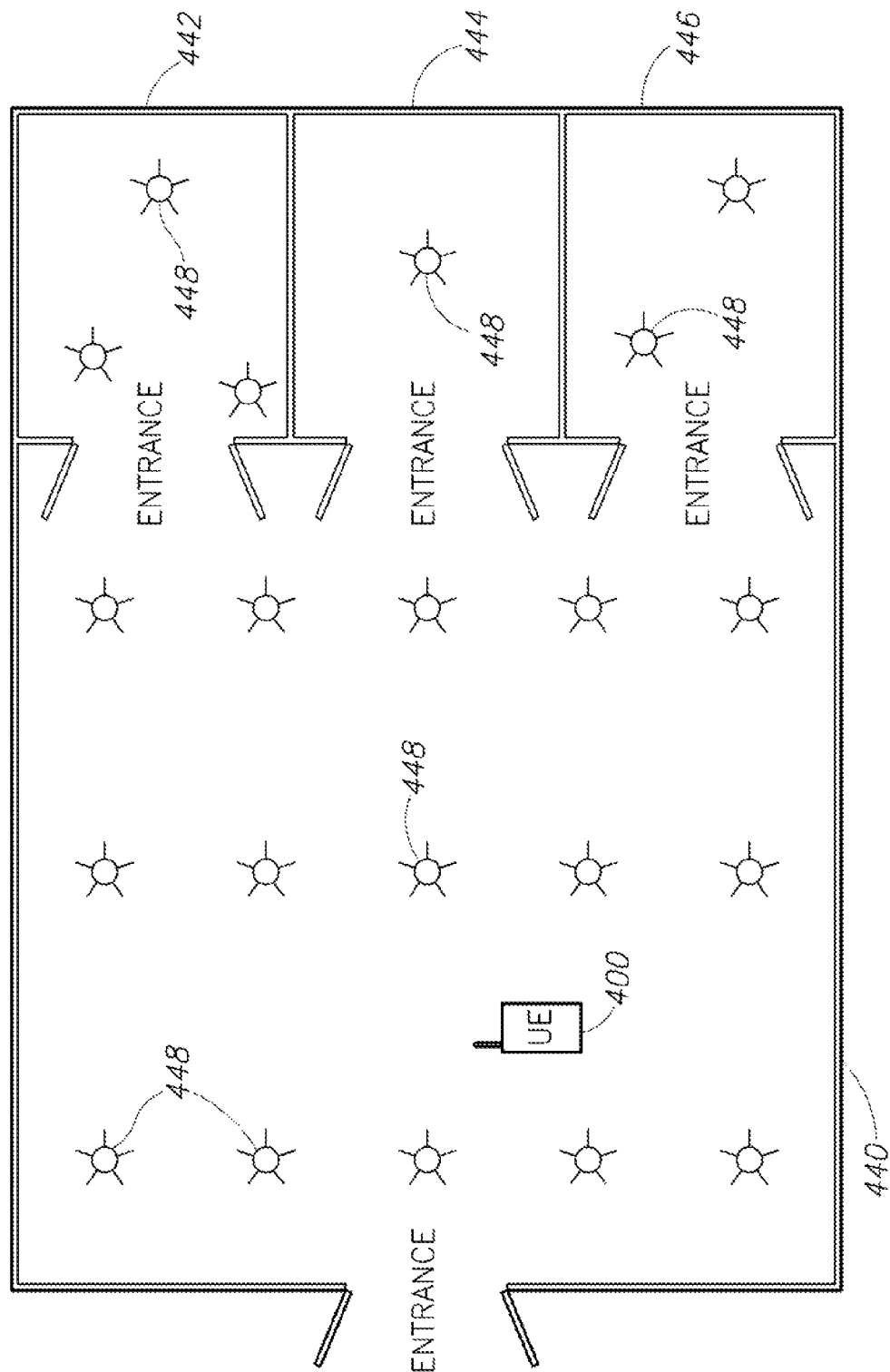
FIG. 7 illustrates a venue with a large number of distributed wireless access points.
Figure 8:
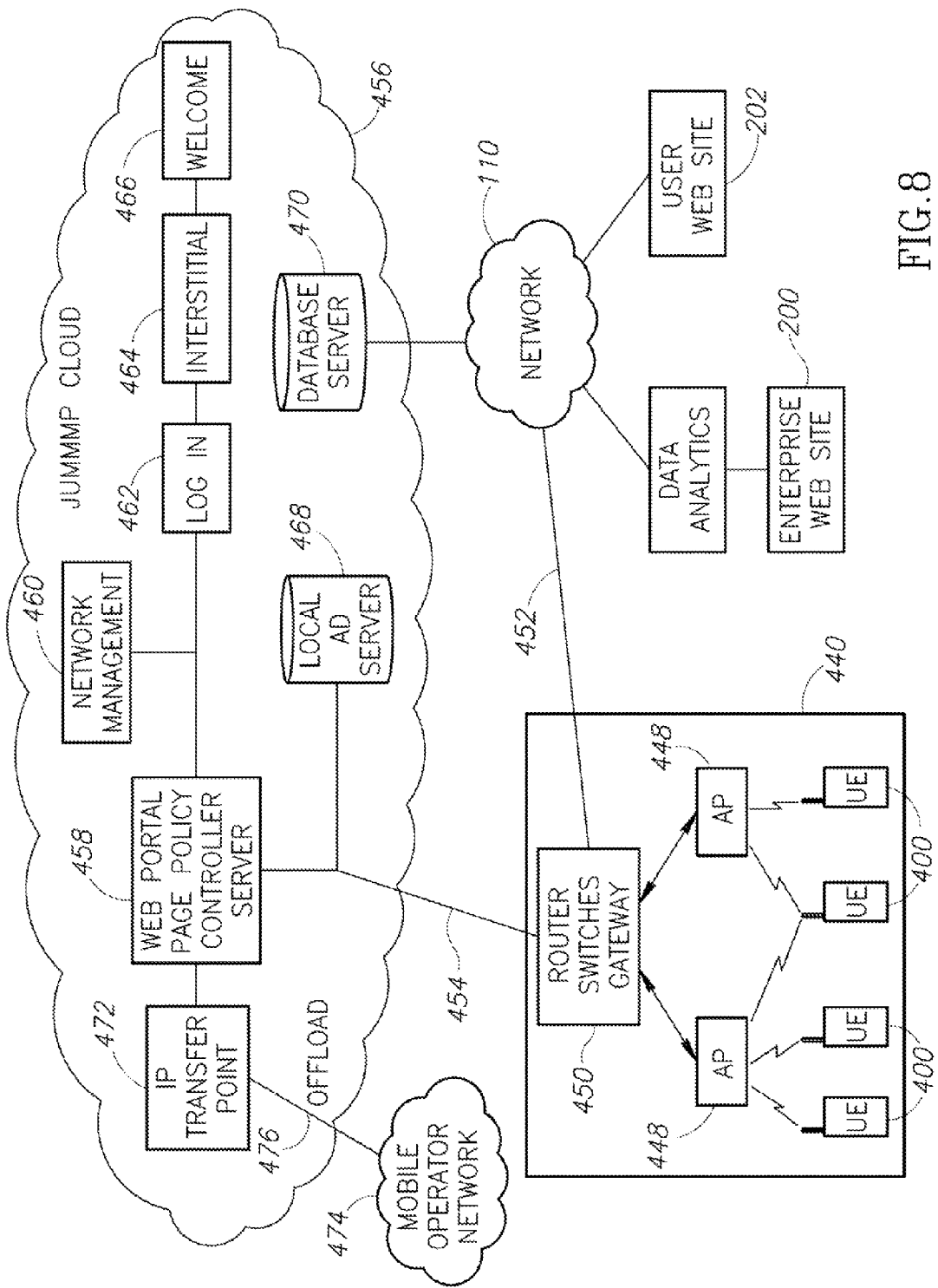
FIG. 8 illustrates a system architecture in which a venue communicates with a Cloud network.

In another example application of the system 100, a business may utilize the short-range communication networks 116 to disseminate business information in the form of messages, coupons, advertisements, and the like. In addition, a wireless communication device may communicate with multiple vendors within a particular venue and receive information that varies from one venue to another. This is illustrated in FIGS. 6-8. In FIG. 6, wireless communication devices are referred to generically as user equipment (UE). The term UE is intended to include any wireless communication device capable of processing audio, video, and text messaging. This includes smart phones, laptops, PDAs, computer tablets (e.g., an iPad™), and the like.

FIG. 6 illustrates UEs 400-404 in a venue such as a shopping mall. The UE 400 uses the network transceiver 166 (see FIG. 2) to communicate with a radio access network (RAN) 406. The RAN 406 is intended to generically represent a base station (e.g., the base station 104 in FIG. 1) and any associated support circuitry. The UE 400 establishes a wireless communication link 408 with the RAN 406 in a conventional manner.

FIG. 6 also illustrates wireless communication links 410-412 coupling the UE 400 with access points (APs) 416-418, respectively. In a typical shopping mall setting, the APs 416-418 may typically be associated with different stores in the shopping mall. As such, the APs associated with different stores will each have a different feature set and are controlled by a separate server. Each AP may have its own operational policy and policy server or policy engine. In addition, each AP may or may not allow device-to-device communication (i.e., communication between the UEs). Furthermore, each AP may or may not allow access to the Internet (e.g., the network 110). For example, the AP 416 may or may not allow the UE 400 to access the network 110 based on the particular policies implemented by the AP 416.

In one embodiment, the UE (e.g., the UE 400) must log on and register with each AP (e.g., the AP 416) in order to establish the wireless communication link 410 to receive ads or other content from the AP 416. As the UE moves into range of another AP (e.g., the AP 428), the UE 400 can perform another log on and authentication process with the new AP. In an alternative embodiment, described in greater detail below, the various stores may become part of a larger Cloud network and permit automatic authentication of a US whenever it comes within range of the AP.

FIG. 6 also illustrates the UE 404 communicating with the AP 418 via the wireless communication link 420. The UE 402 also communicates with the AP 418 via a wireless communication link 422. In FIG. 6, the UE 402 establishes wireless communication links 424-426 with APs 428-430, respectively. In the example if FIG. 6, the AP 428 and the AP 430 may be co-located in the same store and are coupled to a server 432. In this embodiment, the two APs 428-430 form a network back bone that creates a tether for multiple phones within the store in which the APs are located. As the customer moves throughout the store, the UE 402 will connect to the AP 428 or the AP 430 depending on the signal strength. If other UEs come within range of the APs 428-430, the UEs may communicate for the all the purposes described above either directly or via the WiFi AP mesh network formed by the APs 428-430.

As will be described in greater detail below, the server 432 may control the flow of data to and from the UE 402 via the AP 428 and/or the AP 430. Those skilled in the art will appreciate that the APs (e.g., the AP 416) can be implemented in a variety of fashions. In one embodiment, the AP 416 may be directly coupled to a service provider. For example, the AP 416 may be implemented as a cable modem with a wireless connectivity for the UE 400. In another embodiment, the AP 416 may be coupled to a computer (not shown) which controls operation of the AP 416 as well as controlling communications with the network 110. In this embodiment, the network 110 may be a wide area network, such as the internet.

In addition to the various wireless communication links between the UE 400 and the RAN 406 and/or the AP 416-418, the UE 400 can establish a wireless communication link 434 with the UE 402. The wireless communication link 434 is established using the short-range transceiver 176 (see FIG. 2) thus permitting the UE 400 and 402 to establish the short-range communication network 116. The short-range communication network 116 in FIG. 6 operates in a manner described above.

In the example of FIG. 6, the AP 416 and AP 418 may be access points for different businesses. As the UE 400 moves within range of the AP 416, the wireless communication link 410 is established and the AP 416 may disseminate business information, such as messages, coupons, advertisements, and the like. Similarly, when the UE 400 moves within range of the AP 418, the wireless communication link 412 is established and the UE 400 may receive business information from the AP 418. In the example of FIG. 6, some or all of the information received from the AP 416 via the wireless communication link 410 may be relayed from the UE 400 to the UE 402 via the wireless communication link 434. Thus, information from the business associated with the AP 416 may be disseminated to other UEs (the UE 402 in FIG. 6) via the short range communication network 116. As discussed above, a wireless communication device (e.g. the wireless communication device 128 in FIG. 5) may serve as a hot spot in a short-range communication network 116. However, in some settings, such as the shopping mall example illustrated in FIG. 6, there is generally sufficient coverage provided by the APs spread throughout the shopping mall. Thus, the short-range communication networks may typically be established using an AP, such as the AP 140 in FIG. 4 or any of the APs shown in FIG. 6. As will be discussed in greater detail below, a verification system can be used to assure the authenticity of the information received by the UE 400 from the AP 416 and the AP 418.

In FIG. 6, the UE 402 has established wireless communication links 424-426 with the APs 428-430, respectively. As noted above, these APs may be in a large business. As the user moves from one department to another or from one store level to another, he may move in or out of range of one AP or the other. Thus, the information provided to the UE 402 may be customized for the user based on the user's current location within the business.

FIG. 7 illustrates a large venue 440, such as a casino. In such a large venue, there may be related businesses 442-446 located within or near the venue 440. In the casino example, the related business 442 may be a performance venue for singers, comedy acts, and the like. The related business 444 may be a nightclub while the related business 446 may be a restaurant.

Due to the large size of the venue 440, it may be necessary to deploy a network of APs, illustrated by the reference number 448. The position and coverage area of the APs 448 can be determined based on the particular hardware implementation. The actual distribution and installation of the APs 448 within the venue 440 is within the engineering knowledge of one skilled in the art and need not be described in greater detail herein.

In the embodiment of FIG. 7, all of the APs 448 may be coupled to a server (e.g., the server 432 in FIG. 6) or a gateway 450 (see FIG. 8). As the UE 400 moves throughout the venue 440, it is making and breaking wireless communication devices with one or more of the APs 448. The identity of the UE 400 can be verified by the UE providing a profile and user information and signing up for the WiFi service and downloading the API in exchange for free WiFi service. Initially this may be accomplished through a portal page, as will be described in greater detail below.

Once the identity of the UE 400 has been verified, the server 432 can provide customized messages to the owner of the UE 400. While the UE 400 remains within the venue 440, it is in substantially continuous contact with the APs 448 and may receive data therefrom. For example, the UE 400 could receive an ad for free or discounted tickets to the performance venue 442 or an invitation to happy hour at the nightclub venue 444 or a discounted meal at the restaurant venue 446. If the owner of a UE 400 is not a registered guest at a hotel within the venue 440, the APs 448 could send an invitation or ad to book a room in the venue 440. The UE 400 can communicate with the server 432 via the APs 448 to accept one or more of the ad offers. For example, the UE 400 could transmit an acceptance and book tickets at the performance venue 442. Similarly, the user of the UE 400 can book a room in the venue 440.

The venue 440 can establish virtually continuous wireless communication links with the UE 400 and provide a stream of ad content (e.g., ads, offers, discounts, etc.) for the venue 440 and the related businesses 442-446. Thus, the stream of ad data to the UE 400 may be for the venue 440 and the related businesses 442-446. Alternatively, the venue 440 may provide advertising for a different venue (not shown). For example, if the venue 440 is a casino in a large city, such as Las Vegas, the server 432 may provide ad content for a related business down the street or even for a third-party business with whom the venue 440 has contracted to provide advertising to the UE 400. For example, the AP 448 may provide advertising for a convention at a different venue or for a boxing match at a different venue. Thus, advertising content may or may not be related to the venue 440 in which the UE 400 is presently located.

FIG. 8 illustrates a system architecture that allows operation of the system across multiple venues. In FIG. 7, the venue 440 is illustrated with a limited number of UEs 400 and a limited number of APs 448. As discussed above with respect to FIG. 7, the venue 440 may have a large number of APs 448 distributed throughout the venue. The various APs are coupled together using routers, switches, and the like. Those routers, switches and gateways are illustrated in FIG. 8 by the reference 450. Among other things, the gateway 450 allows an interconnection to the network 110 via a communication link 452, but could be any wide area network. In a typical embodiment, the network 110 may be implemented as the Internet. In addition to the communication link 452, the gateway 450 provides a backhaul 454 to a cloud computing environment designated as a JUMMMP Cloud 456. The backhaul 454 may be implemented in a variety of different manners using known technology. In one embodiment, the backhaul 454 may be routed to the JUMMMP Cloud 456 via the network 110.

Within the JUMMMP Cloud 456 are a number of components. A web portal page and policy controller server 458 controls user authentication across a number of different venues in addition to the venue 440. A network management element 460 controls overall operation of the network in the JUMMMP Cloud 456.

FIG. 8 illustrates a number of different web pages that may be downloaded to the UE 400 in the venue 440. In one embodiment, the venue 440 may include its own server and store its own portal pages. However, such an architecture requires that each venue have a separate server to support this functionality. The system in FIG. 8 advantageously utilizes the web portal page server and policy controller server 458 for multiple venues. The JUMMMP Cloud 456 may have some common pages for all venues, such as a log-in web page 462. However, even the log-in web page may be unique to the venue 440.

In addition to the log-in web page 462, the JUMMMP Cloud 456 may have one or more interstitial web pages 464. For example, interstitial web pages may display information about the venue 440 (or advertising for businesses within the venue, third party advertising, or advertising for other venues within the JUMMMP network) while the user is waiting for completion of the registration verification process. In addition, the JUMMMP Cloud 456 may include one or more welcome web pages 466. The welcome web pages 466 may offer various services, such as a credit card data entry page, and Internet access sign-up page, a voucher code entry page to permit the user to enter discount voucher data, and the like. For example, the initial registration can provide WiFi connectivity at a certain service level, such as a basic bandwidth. However, the welcome pages may include an offer to upgrade WiFi connectivity to a higher bandwidth for an advertised price. If the user is a guest at the venue 440, the charge can be automatically made to the user's room. In another embodiment, the user's phone may be charged for the upgraded bandwidth service. Other similar services may be provided in the welcome web pages 466.

One skilled in the art will appreciate that the interstitial web pages 464 and the welcome web pages 466 may be unique to the venue 440. Even though these web pages may be unique to the venue, the centralized web portal page server 458 within the JUMMMP Cloud 456 simplifies the overall system architecture within the venue 440 and within other venues by eliminating the need for a portal page server within each venue.

A local ad server 468 in the JUMMMP Cloud 456 may provide ads for the venue 440. As discussed above, the ads may be for the venue 440 itself or for the related businesses 442-446 (see FIG. 7). In addition, the ads may be for businesses near the venue 440 (or for other venues in the JUMMMP network). The centralized ad server 468 in the JUMMMP Cloud 456 simplifies the network architecture within the venue 440 and other venues by eliminating the need for an ad server within each venue.

A data base server 470 in the JUMMMP Cloud 456 may be configured to collect a broad range of information regarding the UEs 400 (including the user profile information from the data storage area 184 (see FIG. 2) that was provided when the UE was first identified in the venue. The profile information will help provide targeting marketing and advertising to the UE as it traverses the venue). As previously discussed, data messages may include geo-location data. The geo-location data (e.g., longitude and latitude) can be obtained in several possible ways. In one embodiment, the wireless communication device (e.g., the UE 400 in FIG. 8) may have built-in GPS. Other possible location determination technologies include WiFi, 3G, approximation triangulation, or last-known location of the user. Other known location technologies may also be implemented in the system 100. For example, the UE 400 will communicate with different ones of the access point 448 in the venue 440 shown in FIG. 7. As the UE 400 moves throughout the venue, new communication links are established with nearby access points 448. By identifying which access point 448 the UE 400 is communicating with, it is possible to determine the location of the UE 400 with a reasonable degree of accuracy. The database server 470 is configured to store location information, along with time/date data to thereby track movements of the UE 400. In one embodiment, the database server 470 can also be configured to store message data from the UEs 400 throughout the system 100. In yet another embodiment, the database server 470 may also store user profiles for the UE 400 as well as profile data collected by the UE 400 from other JUMMMP users. In one configuration, the API, which is installed on the UE 400 as part of the verification process described above, is configured to generate a "heartbeat" signal that periodically reports location data back to the database server 470. The location data may include a time/date stamp to provide location information for the UE 400. This information can be useful for marketing purposes. Using the example of FIG. 7, where the casino venue 440 includes a large area as well as related businesses 442-446, the database server 470 can determine how long the UE 400 remains in a particular area (e.g., one area of the casino), how many times and how long the UE remains at the bar, in a nightclub or the like. By collecting this information, the database server 470 can establish a user profile for the UE 400 for marketing purposes.

The JUMMMP Cloud 456 also includes an IP transfer point 472, which is coupled to a mobile operator network 474 via a communication link 476. As those skilled in the art will appreciate, mobile data offloading, also called data offloading, involves the use of complementary network technologies for delivering data originally targeted for cellular networks, such as the mobile operator network 474. In areas where the cellular network traffic is heavy, network congestion may occur. To reduce congestion, mobile network operators sometimes set up WiFi access points in areas of congestion and allow some of the data originally targeted for the mobile operator network 474 to be carried by the WiFi network. Rules triggering the mobile offloading action can be set by an end user (i.e., the mobile subscriber) or the mobile network operator. The software code operating on the offloading rules can reside in the UE 400, in a server, or divided between these two devices. For the end users, the purpose of mobile data offloading may be based on the cost for data service and the ability of higher bandwidth. For mobile network operators, the main purpose for offloading is to reduce congestion of the cellular network. The primary complementary network technologies used for mobile data offloading are WiFi, femtocells, and integrated mobile broadcast.

In a typical embodiment, each mobile network operator has its own WiFi network to offload data that would otherwise be carried on its particular mobile operator network. In the context of FIG. 8, the APs 448 within the venue 440 do not belong to the operator of the mobile operator network 474 as is normally the case in data offloading. In the implementation described in the present disclosure, the data offloading is provided by the venue 440 through contract with the mobile operator network 474. Although FIG. 8 illustrates only a single mobile operator network 474, those skilled in the art will appreciate that it is representative of one or more mobile operator networks. In operation, each mobile operator network contracts with the venue 440, either directly or with the JUMMMP Cloud 456, to provide data offloading in the venue. When the UE 400 enters the venue, the mobile network operator is notified and the mobile operator network 474 can determine whether or not to offload data traffic for that UE. If data offloading for the UE is approved in accordance with the rules described above, Internet access, text messaging, and even telephone calls can be provided to the UE 400 via a connection from the mobile operator network 474 through the communication link 476 to the IP transfer point 472 within the JUMMMP Cloud 456. In turn, that offloaded data is routed through the backhaul 454 to an AP 448 and ultimately to the UE 440. Similarly, outgoing calls from the UE 400 may be routed in the reverse fashion. This approach has the beneficial effect of offloading traffic from an otherwise congested mobile operator network 474. In addition, the mobile network operator may find improved performance because direct communication with the UE 400 through a base station (e.g., the base station 104 in FIG. 1) may not work well when the UE 400 is inside a building, such as the venue 440. Thus, improved reception and reduction in network congestion are double benefits of the IP offloading provided by the JUMMMP Cloud 456.

In the embodiment of FIG. 8, the policy server controller 458 may function as a registration server to assure the authentication of the UE 400. Those skilled in the art will appreciate that the components shown in the JUMMMP Cloud 456 are illustrated as individual elements. In one embodiment, a single policy controller server 458 may be sufficient for a large area, such as the entire country. Indeed, in one embodiments, a single policy controller server 458 may provide registration services for the entire system 100. However, those skilled in the art will appreciate that the policy controller server 458 may be illustrative of a number of different computing platforms designed to implement the functionality of the policy controller server. In one embodiment there may be a policy controller server for large cities, individual states, regions of the country, or an entire country. In another embodiment, the policy controller server 458 may be implemented in a hierarchical fashion where a local or regional policy server controller 458 contains local and regional data, but may communicate with regional or national policy controller servers 458 on a higher hierarchical level. For example, if the UE 400 performs an initial registration in one city, that registration data may be stored in a local implementation of the policy controller server 458 and reported to a regional or national level of the policy controller server. In this manner, the registration data may be efficiently distributed throughout a wide area. As will be discussed in detail below, this arrangement also facilitates easy subsequent authentication of the UE 400.

The UE 400 must register with the system 100 at some initial point in time. The initial registration can be performed remotely using, by way of example, a laptop or PC 110 (see FIG. 1) connected to the JUMMMP Cloud 456 via the network 110. In another variation, the UE can perform an initial registration as it enters the venue 440 illustrated in FIG. 8, as described above. When the UE 400 initially contacts the AP 448, the policy controller server 458 will not have any data related to a particular UE 400. In this case, that initial AP 448 in the venue 440 may perform an initial registration. For the initial registration, the UE 400 can connect to the initial AP 448 and provide identification information. In an exemplary embodiment, the user can complete the initial registration process by providing data, such as the telephone ID (i.e., the phone number), a device ID, a user ID, and an email address as well as other information, such as the user profile in the data storage area 184 (see FIG. 2). The user ID may be a user generated name, nickname, or the like. The device ID may vary based on the particular type of the UE 400. For example, if the UE 400 utilizes an Android™ operating system, the device will be assigned an Android™ ID. In addition, the UE 400 may typically be assigned an international mobile equipment identification (IMEI). Any of these device identifications alone may be transmitted to the registration server 460. In another alternative embodiment, a unique hash of one or more device IDs may be generated and transmitted to the registration server 460 as the device ID. The short-range transceiver 176 (see FIG. 2) may also include an identification, such as a MAC address that is unique to the UE 400. The registration data described above can be provided to the registration server 460 along with the MAC address. The registration data may be stored in association with the MAC address. Once the initial registration process has been completed, subsequent authentications are greatly simplified. Once the initial registration process is completed, the web portal page server 458 may transmit other pages, such as the log-in web page 462, one or more interstitial web pages 464, and the welcome web page 466 shown in FIG. 8.

The UE 400 can also perform the initial registration using a conventional wireless service provider network. As previously discussed the UE 400 can communicate with the RAN 406 (see FIG. 6) via the wireless communication link 408 in a conventional manner. Those skilled in the art will appreciate that the UE can access the network 110 via the RAN 406. Conventional wireless service provider components, such as a gateway to the network 110 are known in the art, but not illustrated in FIG. 6 for the sake of clarity. In one embodiment, the UE 400 can perform a registration process with the registration server 460 via the RAN 406. In this embodiment, the UE 400 accesses a website, such as the JUMMMP network website 200 illustrated in FIG. 3. In this example, the registration server 460 may be associated with the JUMMMP network website 200 (see FIG. 3) or the JUMMMP Cloud 456 of FIG. 8.

Alternatively, the UE 400 may perform an initial registration using a conventional computer (e.g., the user computing device 112 of FIG. 1) to provide the registration data for the UE 400 to the policy controller server 458. For example, the user may make a reservation to visit a hotel, such as the casino venue 440 illustrated in FIG. 7. In a confirmation email from the hotel, the user may be invited to perform a registration process with the registration server using, by way of example, a link to a registration web page. If the user has previously registered the UE 400 with the policy controller server 458, the user can simply provide a message to the policy controller server 458 that the user (and the UE 400) will soon be in Las Vegas. The policy controller server 458 can download the authentication information to the local or regional registration server associated with the geographic locale of the casino venue 440. In addition, the registration server 460 may preload the data in the Allowed List 184*a* and the Blocked List 184*b* in the UE even before the UE 400 arrives in Las Vegas.

If the UE registration occurs at the venue via an AP (e.g., the AP 448 in FIG. 8), the policy control server 458 knows the geographic locale of the UE 400. The downloaded data for the Allowed List 184*a* (see FIG. 2) and the Blocked List 184*b* are lists of authenticated and unauthenticated APs in the geographic region in which the UE 400 is presently located. In this manner, the UE 400 knows that information, such as messages, coupons, advertisements, and the like are received from valid and registered businesses. At the same time, the UE 400 will block such data if the AP sending such data is in the Blocked List 184*b*.

In one embodiment, a previously-registered UE 400 may come within range of the initial AP 448 in the venue 440 of FIG. 8 and establish a wireless communication link therewith. In establishing the communication link, the UE 400 transmits its MAC address and/or the phone ID or IMEI. The AP 448 transmits an authentication request message to the registration server 416 to determine whether the UE 400 is a registered device. Based on the MAC address, the registration server can confirm that the UE 400 has previously registered. Thus, the UE 400 is authenticated whenever it comes into range of an AP 448 of the system 100. This may occur transparently to the user. This automatic authentication process can occur even if the initial registration was in a completely different part of the country. Thus, the UE 400 may move from one venue 440 to another in the same city or region or may be in a completely different part of the country and be automatically identified and authenticated with APs that are part of the system 100 described herein. This convenient registration and authentication avoids the need for constantly searching for a WiFi connection as required by other systems. Based on this automatic authentication process, the UE 400 may be automatically connected to the WiFi network created by the APs 448 in the venue. The UE 400 may get welcome greetings from the venue and may also receive advertising, offers, discounts, and the like.

Figure 9:
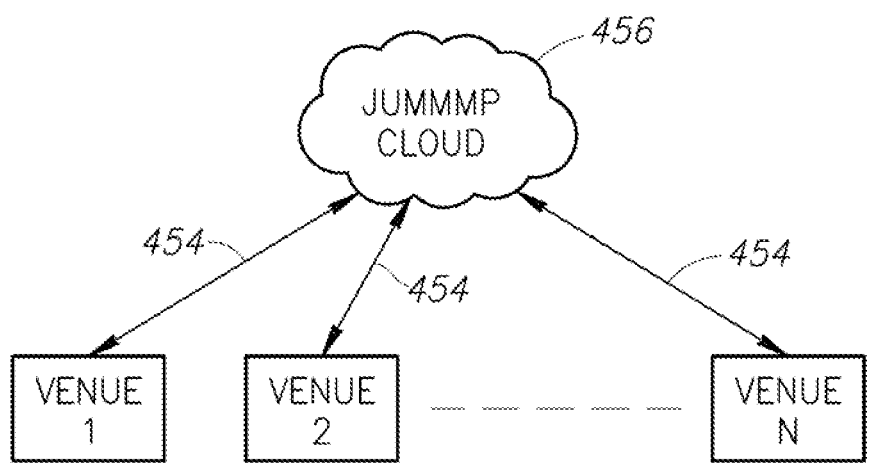
FIG. 9 illustrates the Cloud network of FIG. 8 communicating with multiple venues.

The registration process at a single venue has been discussed above with respect to FIG. 8. The JUMMMP Cloud 456 also advantageously provides a centralized registration function for multiple venues, as illustrated in FIG. 9. The multiple venues 440 are each connected to the JUMMMP Cloud 456 via individual respective backhauls 454. If a UE 400 initially registers at Venue 1, using the registration process described above, that registration information is stored in the JUMMMP Cloud 456. At a later point in time when the user enters, by way of example, Venue 2 illustrated in FIG. 9, the UE 400 will automatically identify the AP 448 and begin to communicate therewith. Because the UE 400 has already been registered, that information is passed along to the JUMMMP Cloud 456 and the Allowed List 184*a* (see FIG. 2) and the Blocked List 184*b* are automatically downloaded to the UE 400 for its new current location. This is true even if the various venues 440 are located far from one another. For example, an initial registration of the UE may take place at a sports venue in, by way of example, New York City. However, if the UE 400 is carried to a casino in, by way of example, Las Vegas, Nev., the UE 400 will automatically begin to communicate with the AP 448 in the new venue in Las Vegas. Because each venue is coupled to the JUMMMP Cloud 456, the UE 400 need not undergo another registration process when it enters the venue 440 in Las Vegas. Thus, a single registration process at any venue is sufficient for registration with the JUMMMP Cloud 456. Whenever the UE 400 goes into a different venue 440 that is coupled to the JUMMMP Cloud 456, the UE 400 is automatically recognized and authenticated. During the automatic authentication process, the JUMMMP Cloud 456 may provide interstitial portal pages 464 to the UE 400. Upon completion of the automatic registration process, welcome portal pages 466 may then be transmitted to the UE 400.

Figure 10:
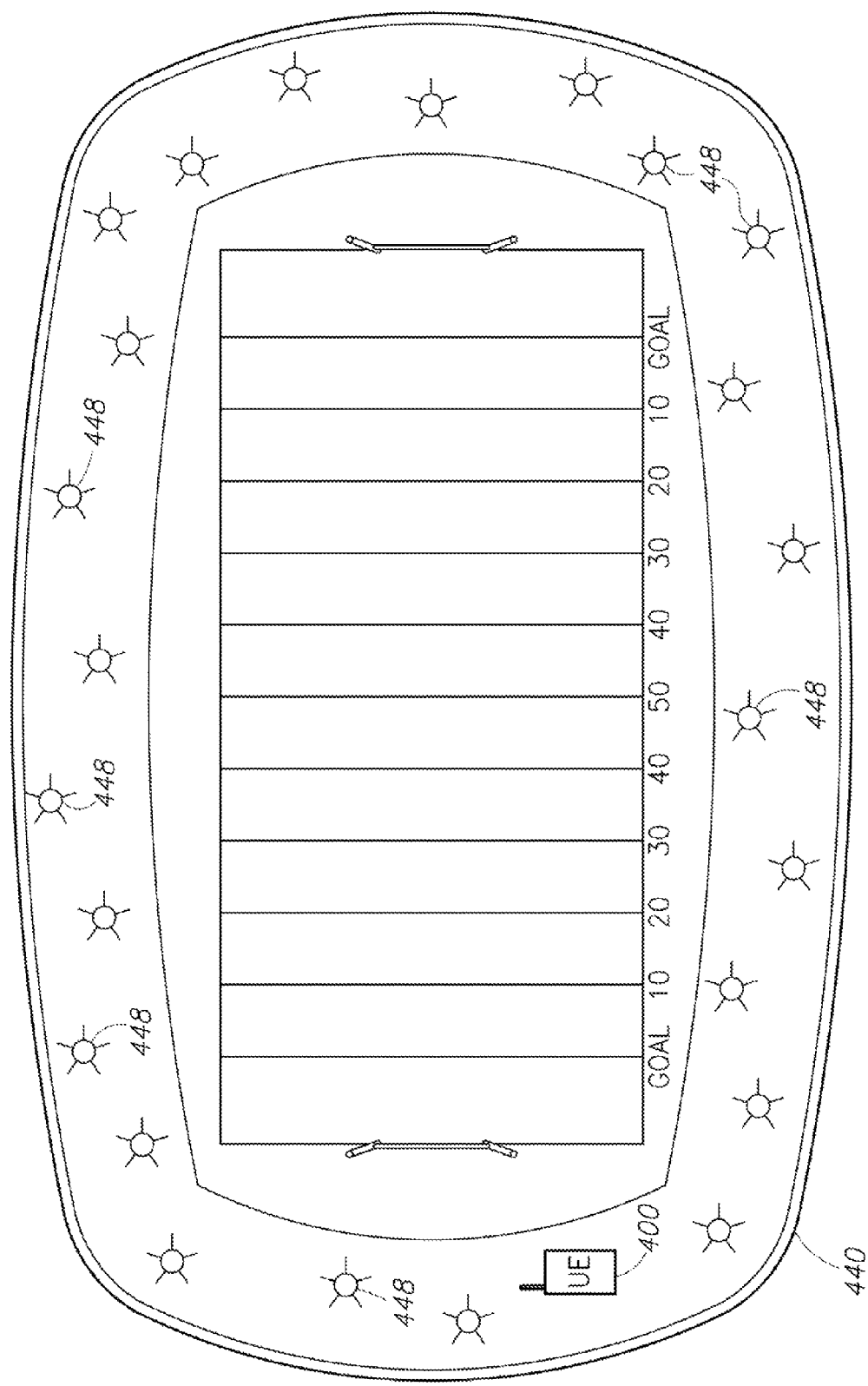
FIG. 10 illustrates a large array of wireless access points distributed throughout a sports venue.

In another example of a business-related implementation, the venue 440 may be a football stadium, as illustrated in FIG. 10, or some other sports venue. In this embodiment, the APs 448 are distributed throughout the structure of the sports venue. The UE 400 communicates with one or more of the APs 448 in the manner described above. The UE 400 can perform an initial registration process or an automatic re-registration process, as described above. The APs 448 maintain virtually continuous contact with the UE 400 while it is within the sports venue 440. As discussed with respect to FIG. 8, the APs 448 are coupled to the gateway 450 to allow the JUMMMP Cloud 456 to disseminate information to the UE 400 in the manner described above. The disseminated information may be in the form of advertisements from vendors within the venue 440. For example, the UE 400 can communicate with the JUMMMP Cloud 456 via one or more AP 448 to retrieve a map of the stadium, to order food for pick-up at a designated spot or to order food for delivery directly to the user's seat in the stadium. Other information from the local ad server 468 in the JUMMMP Cloud 456 may provide discount coupons to the stadium sports clothing vendor to use during or following the game.

The JUMMMP Cloud 456 may also provide streaming video to the UE 400. For example, if the sports venue in FIG. 10 is a football stadium, the JUMMMP Cloud 456 may provide streaming video highlights or even complete games from a different football stadium that is also coupled to the JUMMMP Cloud 456. While some stadiums provide selected replays on a large screen TV or other display for fans, such displays are not available if the user is away from the field to get a drink, go to the bathroom, etc. However, with the system described herein, the instant replay may be provided directly to the UE 400 at virtually any location throughout the sports venue 440. In this embodiment, the instant replay may be multicast to all UEs within the sports venue 440 by the multitude of APs 448.

In another embodiment, the UE 400 may be request instant replay video from the JUMMMP Cloud 456. In this example, a customized replay video may be provided specifically to the UE 400 rather than a multicast to all UEs within the sports venue 440. The request for customized video may be related to the sports venue 440 in which the UE is presently located or may be a request for replay video or streaming video from a different sports venue.

In the example of FIG. 10, the data delivered from the local ad server 468 (see FIG. 8) to the UE 400 may be related to the specific venue 440, such as advertisements for related businesses (not shown). In other examples, the data provided to the UE 400, such as instant replay video data, is directly related to the sporting event itself. In both cases, the data provided to the UE 400, or received from the UE 400 relates to the particular venue 440. Alternatively, the local ad server 468 may provide advertising to unrelated businesses, such as a coupon for a nearby restaurant that can be used following the sporting event.

In one embodiment, the instant replay for the venue 440 (see FIG. 8) may be provided by the JUMMMP Cloud 456 in the manner described above. In yet another embodiment, the local server 432 (see FIG. 6) within the venue 440 may provide some services, such as the streaming media or instant reply for activities within that local sports stadium.

The authentication process for the UE 400 has already been described in detail above. In one aspect of the initial registration, the user can provide credit card or other financial information. In the example of the casino venue 440 in FIG. 7, the user may provide credit card information for a hotel room in the casino, upgrades, such as a bandwidth upgrade, performance tickets, or the like. In one embodiment, the financial information may be stored in an encrypted or protected form on the JUMMMP Cloud 456. At a subsequent time, such as when the user enters the sports venue 440 in FIG. 10, the automatic authentication process described above will occur in a manner transparent to the user. In an alternative embodiment, the UE may order food and drink to be delivered directly to the user's seat within the sports venue. In this aspect, the UE 400 communicates with one of the APs 448 to select a food ordering menu from the welcome web pages 466. The credit card associated with the UE 400 may be charged for the food, which may be delivered directly to the user's seat in the sports venue.

Figure 11:
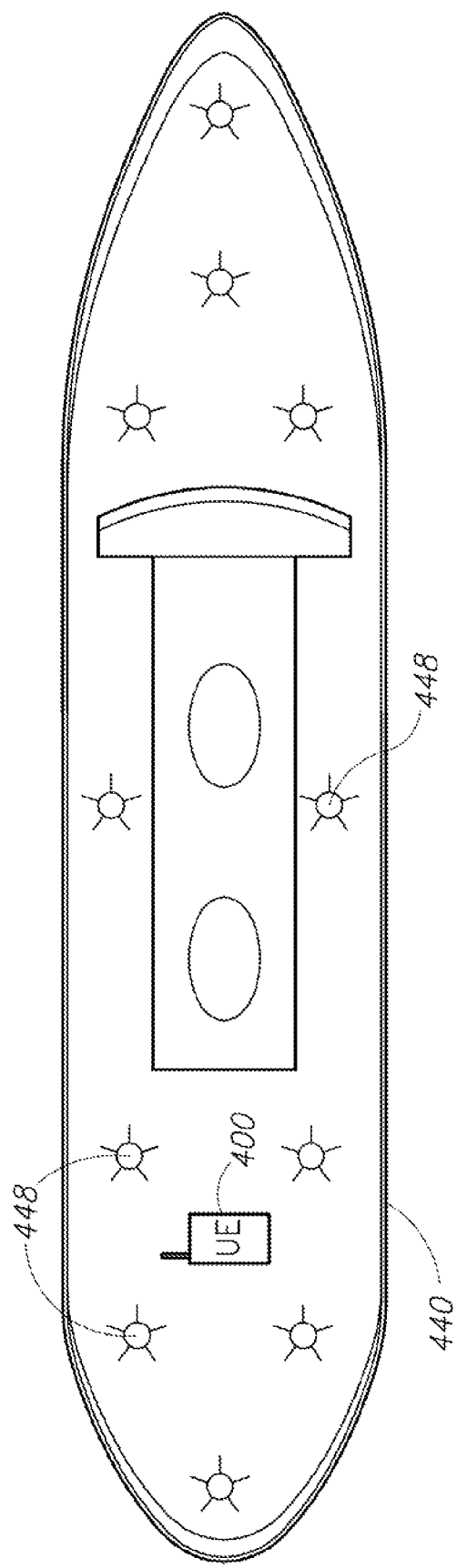
FIG. 11 illustrate an array of wireless access points throughout a cruise ship venue.

In the examples of FIGS. 7 and 10, the venue 440 is a fixed location, such as a casino venue in FIG. 7 and the sports venue in FIG. 10. FIG. 11 illustrates a cruise ship venue 440 in which the entire venue is mobile. As illustrated in FIG. 11, a number of APs 448 are distributed throughout the ship. Although FIG. 11 illustrates only a top view of a single deck, those skilled in the art will appreciate that a plurality of the APs 448 are distributed throughout the ship at various deck levels to provide complete coverage throughout the cruise ship venue 440. In this example, the UE 400 will register with one of the APs 448 as soon as the user comes within range of the cruise ship venue 440. As discussed above, if UE 400 has been previously registered with the JUMMMP Cloud 456 (see FIG. 9), the automatic authentication process will occur in a manner transparent to the user. Thus, the UE 400 is automatically authenticated as soon as the user boards the cruise ship venue 440. The on-board vendors can be authenticated vendors and data (ads, coupons, etc.) can be delivered in the manner described above with respect to other venues. In addition, authenticated vendors at ports-of-call can provide data to the authenticated UE 400. In this manner a passenger can receive coupons or other data, such as on-shore activity information, to provide a more enjoyable cruise experience to the passenger.

The UE 400 maintains complete contact with the WiFi network provided by the plurality of APs 448 so long as the UE is on the cruise ship. If the user participates in an on-shore activity, the UE 400 will be automatically re-authenticated when the user returns to the cruise ship venue 440. In this embodiment, the gateway 450 (see FIG. 8) on the cruise ship may communicate with the JUMMMP Cloud 456 via a satellite link (not shown) or other radio communication link well known in the art.

Figure 12:
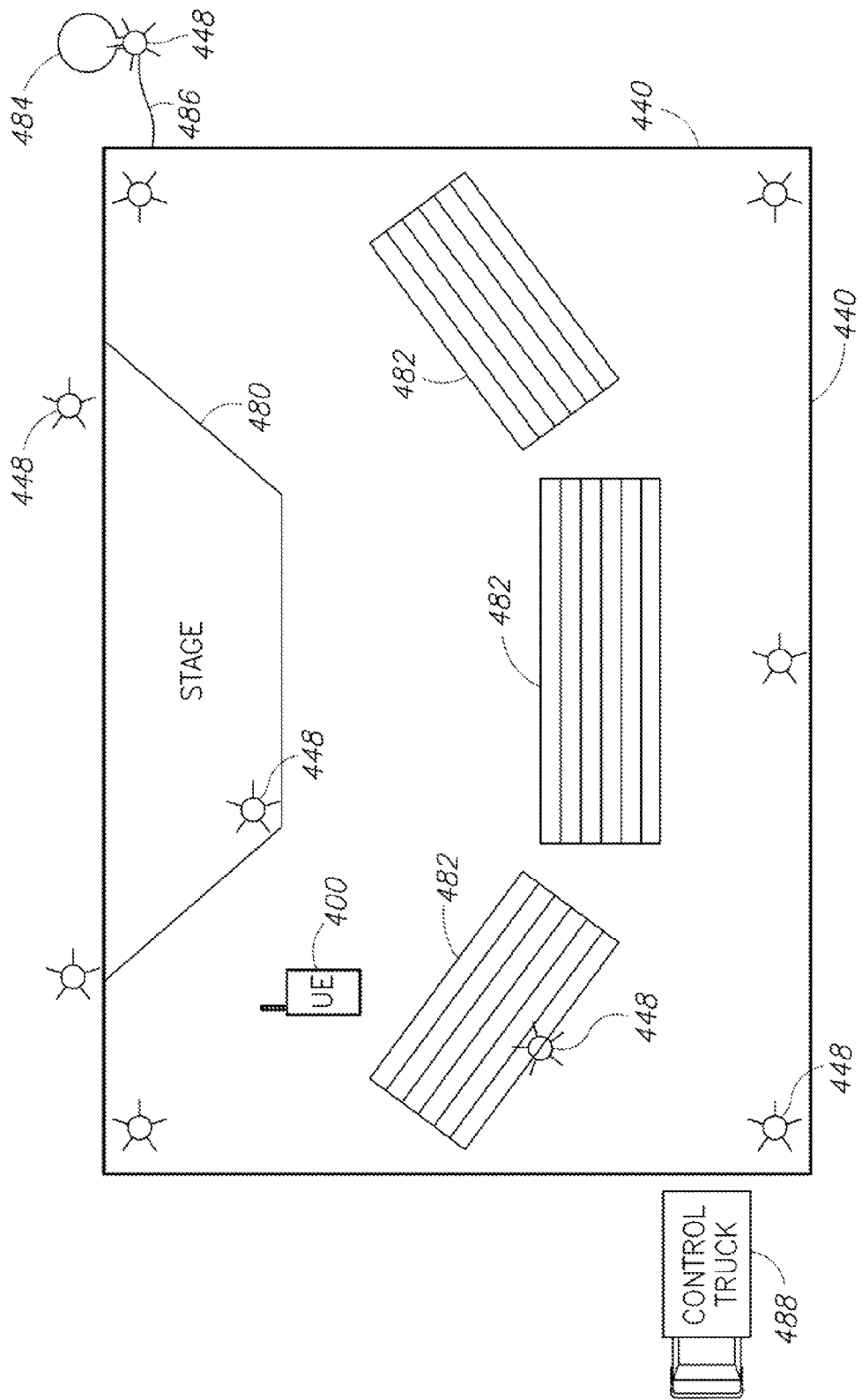
FIG. 12 illustrates an array of wireless access points distributed throughout a temporary concert venue.

In the examples provided above, the APs 448 are in fixed locations throughout the venue 440 to maximize coverage throughout the venue. This is true whether the venue 440 is a fixed facility, such as the casino venue or sports venue or whether the venue is in motion, such as the cruise ship venue. However, the system described herein is flexible enough to provide temporary coverage in a venue that does not have preexisting coverage. For example, a concert hall may not have existing coverage through a network of APs as described above. For example, a concert venue at the state fair may be temporary in nature. Similarly, a concert venue may be constructed temporarily at an open air location (e.g. Woodstock or a speedway). In yet another example, some venues, such as a racetrack that is constructed temporarily, may not have an existing infrastructure of APs 448. In yet another example embodiment, the system described herein can provide a temporary mobile venue infrastructure, which may be referred to herein as "WiFi on Wheels" (WoW). An example of a WoW implementation is illustrated in FIG. 12. The example of FIG. 12 is a temporary concert venue, such as may be common at a state fair or other location. A stage 480 and grandstands 482 may be positioned within the venue. The location of the APs 448 throughout the venue 440 may be dependent on the location of the stage 480 and the grandstands 482 to provide the necessary coverage. In this embodiment, the APs 448 may be mounted on existing infrastructure, such as telephone poles, light poles, and the like. In addition, temporary poles may be installed to support additional APs 448. In yet another embodiment, the venue may include a balloon 484, which is maintained in position over the venue 440 by a tether 486. An AP 448 is mounted to the balloon 484 to provide a broad area of coverage beneath the balloon. Tethered balloons are often used in locations, such as an auto dealership, opening night extravaganza, or the like. In the embodiment illustrated in FIG. 12, the balloon 484 is outfitted with the AP 448 to provide wireless services in the temporary concert venue 440. The APs may also be mounted directly to the stage 480 or the grandstand 482. A control truck 488 or other mobile vehicle may contain the additional infrastructure for the temporary concert venue 440. For example, the control truck 488 may contain the router switches gateway 450 (see FIG. 8) to provide the necessary connection to the JUMMMP Cloud 456. The control truck 488 may also include a satellite link to implement the backhaul 454. The backhaul 454 can also be implemented as a microwave link from the control truck 488 or a hardwired connection if available. Thus, the WoW implementation of FIG. 12 can be set up and removed in a relatively short period of time.

In operation, the temporary concert venue 440 operates in the same manner described above with respect to other venues. That is, the UE 400 is automatically authenticated if the UE 400 has previously been authenticated with the JUMMMP Cloud 456. If the UE 400 has never been registered with the JUMMMP Cloud 456, the UE undergoes an initial registration process described above with respect to FIG. 8. Thus, the temporary concert venue 440 operates in a functionally identical manner to the fixed venues described above.

To assure the authenticity of data provided to the UE 400, the system 100 provides a registration process that lists validated APs (e.g., the APs 416-418 of FIG. 6) in proximity with the UE 400. FIG. 8 illustrates an exemplary system architecture for the registration process using many of the elements previously described. In the example of FIG. 8, the UE 400 comes within range of one or more of the APs 448. The first AP 448 detected by the UE 400 may be considered an initial wireless access point for purposes of the registration/authentication process. In one example, the UE 400 may never have been registered with the system 100 and may not have the API stored in the memory 152 (see FIG. 2). In this embodiment, the UE 400 may search for a nearby wireless access point with which to communicate. The UE 400 will detect the initial AP 448 as described above and connect with that device. The initial AP 448 can download the API and perform an initial registration, as will be described in greater detail below.

In another embodiment, if the UE 400 has previously registered with the system 100, that registration data will be stored in the JUMMMP Cloud 456. Because the API is part of the operating system, it is always operating in the background and will automatically be detected by the initial AP 448 when the UE 400 enters the venue 440. In the example of FIG. 7, when the UE 400 enters the casino venue 440, its presence will be automatically detected by one of the APs 448. The identification information for the UE 400 is automatically provided to the AP 448 and relayed to the JUMMMP Cloud 456. The JUMMMP Cloud 456 can authenticate the UE as a previously registered device. Upon completion of the authentication process, the JUMMMP cloud 456 can download the Allowed List 184a (see FIG. 2) and the Block List 184b for the geographic region surrounding the initial AP 448.

The registration and authentication process for the UE 400 has been described above. However, it is also important that the individual businesses or enterprises perform a registration process as well. When a business performs a registration process, its associated data is placed in an Allowed List stored in the JUMMMP Cloud 456 and provided to the UE 400 upon authentication of the UE. This Allowed List data, stored in the Allowed List 184a (see FIG. 2), provides the UE with greater assurance that it is communicating with an authenticated vendor. As described above, the UE 400 performs an initial registration process and performs a subsequent automatic authentication whenever it comes within contact of an AP. As noted above, the subsequent authentication processes can be configured to occur automatically and transparently without operation of the UE 400. This provides the user with the ability to move about freely and register with APs in the system as it encounters them. Because the business enterprise is generally fixed in location, there is only a need for the initial registration. If a business, such as a chain of coffee shops, opens a new location, the new location may be registered in a separate process. In one embodiment, the enterprise may pay a fee for registration and use of the communication system described herein. Upon registration, the business may be assigned a unique SSID that will be included in the Allowed List to be downloaded to the Allowed List 184a (see FIG. 2) in the wireless communication device. Although the JUMMMP Cloud 456 may contain a list of authenticated businesses throughout a large region or even nationally, it is only necessary to send the list of SSIDs for authenticated APs for the geographic region corresponding to the current location of the UE 400. In the example of FIG. 7, where the UE 400 is within the casino venue 440, the JUMMMP Cloud 456 can transmit a list of authenticated vendors for the casino venue 440, the associated venues 442-446 and any other nearby venues. For example, the casino venue 440 may have a nearby amusement park and can offer discount or other information related to the amusement park. The Allowed List 184a in the wireless communication device can include the authentication data for APs associated with the amusement park in addition to those associated with the casino venue 440 and associated venues 442-446.

The list of unauthenticated vendors is generally constructed using data from the individual UEs. For example, when a UE 400 receives an offer from a vendor that is not on the Allowed List 184a, the UE can report the unauthenticated vendor and automatically place that authentication data in the Blocked List 184b. The Blocked List 184b may be uploaded from the UE 400 to the JUMMMP Cloud 456. A list of unauthenticated vendors is compiled by the JUMMMP Cloud based on reports from multiple UEs 400. As discussed above, the UE 400 also transmits geo-location data and a time/date stamp. In this manner, the JUMMMP Cloud 456 can determine the geographic location of an unauthenticated vendor and include that data for storage within the JUMMMP Cloud. During a subsequent authentication process with any UE 400, the JUMMMP Cloud 456 can download data for both the Allowed List 184a and the Blocked List 184b for the geographic area surrounding the present location of the authenticated UE.

As described above, the API causes the UE 400 to periodically send a "heartbeat" signal. The Allowed List 184a and the Blocked List 184b can be updated so that all UEs 400 can be constantly updated and not have to wait until the UE enters a new venue 440 to initiate a new authentication process. This allows the UEs 400 in the venue 440 to be notified in real time or near real time if a vendor has been placed on the Blocked List 184b.

In one embodiment, the blocked list data may be culled to remove old data from unauthenticated vendors. In addition, if an unauthenticated vendor subsequently registers and thereby becomes an authenticated vendor, that data may be switched from the blocked list to the allowed list so that the UE 400 will advantageously receive information from the newly authenticated vendor.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A system for communication between a mobile operator network and a plurality of wireless communication devices in a venue, each of the plurality of wireless communication devices having a network transceiver to permit cellular network communication with a mobile operator network and a non-network transceiver, comprising:
   a plurality of wireless access points distributed within the venue with ones of the plurality of wireless access points configured to establish communication links with the non-network transceivers of the plurality of wireless communication devices in the venue;
   a server associated with the venue;
   a routing infrastructure configured to communicatively couple the plurality of wireless access points to the server; and
   a communication transfer point communicatively coupled to the server and coupled to the mobile operator network via a communication link, the communication transfer point being configured to provide an offloaded communication link between the mobile operator network and a selected one of the plurality of wireless communication devices in the venue to thereby switch communication traffic away from the cellular network and to provide offloaded communications between the selected wireless communication device in the venue and the mobile operator network without using the cellular network;
   wherein the server is configured to route the communications between the communication transfer point and any of the plurality of wireless access points having an established a communication link with the non-network transceiver of the selected wireless communication device in the venue.

2. The system of claim 1 wherein ones of the plurality of wireless communication devices are subscribers of different mobile operator networks, the communication transfer point being coupled to the different mobile operator networks via different respective communication links, the communication transfer point being configured to receive offloaded communications from each of the different mobile operator networks intended for ones of the plurality of wireless communication devices in the venue that are subscribers of the respective different mobile operator networks.

3. The system of claim 1 wherein the server is configured to route the communications between the communication transfer point and all of the plurality of wireless access points.

4. The system of claim 1 wherein the server is further configured to determine which of the plurality of wireless access points have established a communication link with the selected one of the plurality of wireless communication devices in the venue.

5. The system of claim 1 wherein the communication transfer point is configured to receive offloaded communications from the mobile operator network intended for the selected wireless communication device in the venue based on a set of rules that determine whether the mobile operator network will communicate with the selected wireless communication device using the network transceiver in the selected wireless communication device or using the non-network transceiver in the selected wireless communication device.

6. The system of claim 1 wherein the offloaded communications comprise voice communication, text communication and Internet access.

7. The system of claim 1 wherein the server is configured to provide notification to the mobile operator network when the selected wireless communication device establishes a communication link with one of the plurality of wireless access points.

8. The system of claim 1 wherein the server is configured to provide notification to the mobile operator network when the selected wireless communication device terminates the communication link with all of the plurality of wireless access points.

9. The system of claim 1 wherein the communication transfer point is configured to terminate offloaded communications from the mobile operator network intended for the selected wireless communication device wherein communications with the selected wireless communication device automatically switches to communication with the mobile operator network via its network transceiver when the selected wireless communication device terminates communication with all of the wireless access points within the venue.

10. A method for communication, comprising:
   a wireless communication device having a network transceiver to permit cellular network communication with a mobile operator network and a non-network transceiver and using the non-network transceiver to establish a communication link with a wireless access point upon entering a venue, the wireless communication device being a subscriber with the mobile operator network and communicating directly with the mobile operator network using the network transceiver;
   establishing a communication link between the mobile operator network and a server associated with the venue to thereby switch communication traffic away from the cellular network; and
   transferring communications from the mobile operator network to the server to thereby provide communications between the mobile network provider and the wireless communication device via the server and the wireless access point whereby the wireless communication device communicates with the mobile network provider using the non-network transceiver instead of the network transceiver.

11. The method of claim 10, further comprising sending a notification from the venue to the mobile operator network to indicate that the wireless communication device is present in the venue and has established a communication link with the wireless access point.

12. The method of claim 10, further comprising applying a set of rules to thereby determine whether the communications between the mobile operator network and the wireless communication device will use the network transceiver or the non-network transceiver.

13. The method of claim 10 for use with a plurality of wireless communication devices that are subscribers of different mobile operator networks, each of the plurality of wireless communication devices having a network transceiver and a non-network transceiver and using the non-network transceiver to establish respective communication links with the wireless access point upon entering the venue wherein establishing a communication link between the mobile network provider and the server associated with the venue comprises establishing a respective communication link between each of the plurality of mobile network providers and the server; and
   wherein transferring communications comprises transferring communications from the mobile network provider to the server to thereby provide communications between each of the plurality of mobile network providers and any of the plurality of wireless communication devices that are subscribers of the respective mobile network provider via the server and the wireless access point whereby each of the plurality of wireless communication devices communicates with their respective mobile network provider using the non-network transceiver.

14. The method of claim 10 for use in a venue having a plurality of wireless access points associated therewith wherein the server routes the communications between the mobile operator network and all of the plurality of wireless access points.

15. The method of claim 10 for use in a venue having a plurality of wireless access points associated therewith, the method further comprising:
   the wireless communication device establishing communication links with any of the plurality of wireless access points within communication range of the wireless communication device; and
   routing the communications between the mobile operator network and any of the plurality of wireless access points with which the wireless communication device has a communication link.

16. The method of claim 10 wherein the offloaded communications comprise voice communication, text communication and Internet access.

17. The method of claim 10, further comprising notifying the mobile operator network when the selected wireless communication device establishes a communication link with the wireless access point.

18. The method of claim 10, further comprising notifying the mobile operator network when the selected wireless communication device terminates the communication link with the wireless access point.

19. The method of claim 10 wherein the communication intended for the selected wireless communication device is automatically transferred from the server to the mobile operator network when the selected wireless communication device terminates the communication link with the wireless access point.

20. The method of claim 10, further comprising automatically authenticating a registered wireless communication device upon establishing a communication link between the wireless communication device and the wireless access point, and notifying the mobile operator network that an authenticated wireless communication device has established a communication link with the wireless access point.

21. A system for communication between a mobile operator network and a plurality of wireless communication devices in a venue, each of the plurality of wireless communication devices having a network transceiver and a non-network transceiver, comprising:
   a plurality of wireless access points distributed within the venue with ones of the plurality of wireless access points configured to establish communication links with the non-network transceivers of the plurality of wireless communication devices in the venue;
   a server associated with the venue;
   a routing infrastructure configured to communicatively couple the plurality of wireless access points to the server; and
   a communication transfer point coupled to the mobile operator network via a communication link, the communication transfer point being configured to receive offloaded communications from the mobile operator network intended for a selected one of the plurality of wireless communication devices in the venue and to transmit offloaded communications from the selected wireless communication device in the venue to the mobile operator network;

wherein the server is configured to route the communications between the communication transfer point and any of the plurality of wireless access points having an established a communication link with the non-network transceiver of the selected wireless communication device in the venue;

wherein the communication transfer point is configured to receive offloaded communications from the mobile operator network intended for the selected wireless communication device in the venue based on a mobile operator network rule wherein communications with the selected wireless communication device automatically switches to communication with the mobile operator network via one or more of the wireless access points within the venue.

22. A method for communication, comprising:

a wireless communication device having a network transceiver and a non-network transceiver and using the non-network transceiver to establish a communication link with a wireless access point upon entering a venue, the wireless communication device being a subscriber with a mobile operator network and communicating directly with the mobile operator network using the network transceiver;

establishing a communication link between the mobile network provider and a server associated with the venue; and transferring communications from the mobile network provider to the server to thereby provide communications between the mobile network provider and the wireless communication device via the server and the wireless access point whereby the wireless communication device communicates with the mobile network provider using the non-network transceiver;

wherein the communication intended for the selected wireless communication device is automatically transferred from the mobile operator network to the server and the wireless access point based on a mobile operator network rule.

* * * * *